US012323549B2

(12) United States Patent
Suetsugu

(10) Patent No.: US 12,323,549 B2
(45) Date of Patent: Jun. 3, 2025

(54) DEVICE SUPPORT STATUS NOTIFICATION SYSTEM AND DEVICE SUPPORT STATUS NOTIFICATION PROGRAM

(71) Applicant: Katsunori Suetsugu, Tokyo (JP)

(72) Inventor: Katsunori Suetsugu, Tokyo (JP)

(73) Assignee: Katsunori Suetsugu, Tokyo (JP)

( * ) Notice: Subject to any disclaimer, the term of this patent is extended or adjusted under 35 U.S.C. 154(b) by 421 days.

(21) Appl. No.: 17/852,780

(22) Filed: Jun. 29, 2022

(65) Prior Publication Data

US 2023/0007119 A1 Jan. 5, 2023

(30) Foreign Application Priority Data

Jul. 2, 2021 (JP) ................................ 2021-110751

(51) Int. Cl.
 H04M 1/72454 (2021.01)
(52) U.S. Cl.
 CPC .... H04M 1/72454 (2021.01); *H04M 2250/12* (2013.01)
(58) Field of Classification Search
 CPC ......... H04L 51/02; H04L 51/18; H04L 51/52; G06F 40/40; G06F 3/0416; G06F 1/1613; G06F 1/1626; G06F 1/169; G06F 1/1694; G06F 3/017; G06F 3/04142; G06F 3/04886; G06F 2200/1636; G06F 2200/1637; G06F 2203/0339; G06N 20/20; G06N 20/00; G06N 3/08; H04M 1/72454; H04M 2250/12; H04M 1/0281
 See application file for complete search history.

(56) References Cited

U.S. PATENT DOCUMENTS

| | | | | |
|---|---|---|---|---|
| 10,082,936 | B1* | 9/2018 | Dillon | G06F 1/1694 |
| 10,722,165 | B1* | 7/2020 | Douglas | A61B 5/163 |
| 2012/0206556 | A1* | 8/2012 | Yu | H04W 52/38 |
| | | | | 348/14.02 |
| 2014/0105455 | A1* | 4/2014 | Murase | G06F 3/0426 |
| | | | | 382/103 |

(Continued)

FOREIGN PATENT DOCUMENTS

| | | |
|---|---|---|
| CN | 107181861 A | 9/2017 |
| CN | 108600535 A | 9/2018 |

(Continued)

OTHER PUBLICATIONS

Office Action dated Jun. 29, 2022, issued in counterpart JP Application No. 2022-056616, with English machine translation. (7 pages).

(Continued)

*Primary Examiner* — Cindy Trandai
(74) *Attorney, Agent, or Firm* — WHDA, LLP

(57) ABSTRACT

An electronic device to be carried by the user and used by a user executes support status determination on the basis of information for determination acquired by an information acquisition unit that acquire the information for determination that is information to be used for the support status determination that is determination of a device support status that is a status of support of the electronic device by the user and makes a notification of information for notification that is information based on a result of the executed support status determination.

23 Claims, 22 Drawing Sheets

(56) References Cited

U.S. PATENT DOCUMENTS

| | | | |
|---|---|---|---|
| 2015/0022438 A1* | 1/2015 | Hong | G06F 3/017 |
| | | | 345/156 |
| 2015/0365119 A1* | 12/2015 | Shin | H04M 1/0241 |
| | | | 455/575.1 |
| 2016/0092055 A1* | 3/2016 | Lu | G06F 3/017 |
| | | | 715/747 |
| 2018/0293355 A1* | 10/2018 | Allison | G16H 40/67 |
| 2018/0373345 A1* | 12/2018 | Furniturewala | G06F 3/0219 |
| 2019/0268461 A1* | 8/2019 | Ai | H04M 1/72454 |
| 2020/0057498 A1* | 2/2020 | Artemiadis | G06N 20/00 |
| 2020/0249824 A1 | 8/2020 | Zhang et al. | |
| 2020/0272322 A1* | 8/2020 | Zhu | G06F 3/0482 |
| 2020/0333886 A1* | 10/2020 | Hung | G06F 3/0346 |
| 2021/0125518 A1* | 4/2021 | Wada | G09B 7/00 |
| 2023/0009352 A1* | 1/2023 | Kuriyama | G06F 1/1694 |

FOREIGN PATENT DOCUMENTS

| | | |
|---|---|---|
| CN | 108920234 A | 11/2018 |
| JP | 2014-179877 A | 9/2014 |
| JP | 2015-207812 A | 11/2015 |
| JP | 2016-178598 A | 10/2016 |
| JP | 2016-221012 A | 12/2016 |
| JP | 2019-106577 A | 6/2019 |
| JP | 2020-135340 A | 8/2020 |
| JP | 2020-198605 A | 12/2020 |

OTHER PUBLICATIONS

Notice of Reasons for Refusal dated Oct. 20, 2021, issued in counterpart JP Patent Application No. 2021-110751, w/English translation (6 pages).

Notice of Reasons for Refusal dated Feb. 24, 2022, issued in counterpart JP Patent Application No. 2021-110751, w/English translation (9 pages).

Notice of Reasons for Refusal dated Feb. 24, 2022, issued in Divisional JP Patent Application No. 2021-196011 of JP Patent Application No. 2021-110751, w/English translation (8 pages).

* cited by examiner

FIG.6

19f RESULT HISTORY INFORMATION

| DATE AND TIME OF EXECUTION | RESULT | · · · |
|---|---|---|
| . . . | . . . | . . . |
| 2021/07/01 10:15 | CORRECT | · · · |
| 2021/07/01 11:15 | INCORRECT | · · · |
| 2021/07/01 12:15 | CORRECT | · · · |
| . . . | . . . | . . . |

FIG.7

19g INSTRUCTION INTERVAL TABLE

| ACCURACY RATE | INSTRUCTION INTERVAL |
|---|---|
| LESS THAN 50% | 60 MINUTES |
| 50% OR MORE AND LESS THAN 75% | 120 MINUTES |
| 75% OR MORE AND LESS THAN 87% | 240 MINUTES |
| 87% OR MORE AND LESS THAN 93% | 480 MINUTES |
| 93% OR MORE AND LESS THAN 96% | 960 MINUTES |
| 96% OR MORE | 1920 MINUTES |

DEVICE SUPPORT STATUS NOTIFICATION SYSTEM AND DEVICE SUPPORT STATUS NOTIFICATION PROGRAM

CROSS REFERENCE TO RELATED APPLICATION

This application is based upon and claims the benefit of priority from Japanese Patent Application No. 2021-110751 filed Jul. 2, 2021, the entire contents of which are incorporated herein by reference.

BACKGROUND OF THE INVENTION

1. Technical Field

The present invention relates to a device support status notification system and a device support status notification program for making a notification of a support status by a user, of an electronic device to be carried by the user and used by the user.

2. Description of the Related Art

In related art, an electronic device to be carried by the user and used by a user is known (see, for example, JP 2020-198605 A).

SUMMARY OF THE INVENTION

However, the electronic device in related art has a problem that it is difficult for a user to recognize a status of support by the user. As a result, for example, in a case where the user has a habit of supporting the electronic device with the left hand, at least one of fatigue and stiffness may occur on at least one of the left side of the neck, the left shoulder, and the left arm of the user.

It is therefore an object of the present invention to provide a device support status notification system and a device support status notification program capable of causing a user of an electronic device to recognize a support status of the electronic device supported by the user.

A device support status notification system according to the present invention includes: an information acquisition unit configured to acquire information for determination that is information to be used for support status determination that is determination of a device support status that is a status of support by a user, of an electronic device to be carried by the user and used by the user; a support status determination unit configured to execute the support status determination on the basis of the information for determination acquired by the information acquisition unit; and an information notification unit configured to make a notification of information for notification that is information based on a result of the support status determination executed by the support status determination unit.

According to this configuration, the device support status notification system of the present invention executes the support status determination on the basis of the information for determination acquired by the information acquisition unit and notifies the user of the information for notification based on the result of the executed support status determination, so that the user can recognize the device support status.

In the device support status notification system of the present invention, the support status determination unit may instruct the user of the device support status, and the support status determination unit may update a method for the support status determination on the basis of the device support status of which the user is instructed and a result of the support status determination corresponding to the device support status of which the user is instructed.

According to this configuration, the device support status notification system of the present invention updates the method for the support status determination on the basis of the device support status of which the user is instructed and the result of the support status determination corresponding to the device support status of which the user is instructed, so that accuracy of the support status determination can be improved.

In the device support status notification system of the present invention, the support status determination unit may instruct the user of the device support status at a frequency in accordance with an accuracy rate of the support status determination based on the device support status of which the user is instructed and a result of the support status determination corresponding to the device support status of which the user is instructed.

According to this configuration, the device support status notification system of the present invention instructs the user of the device support status at a frequency in accordance with an accuracy rate of the support status determination based on the device support status of which the user is instructed and the result of the support status determination corresponding to the device support status of which the user is instructed, so that it is possible to prevent the user from being instructed of the device support status at an unnecessarily high frequency.

In the device support status notification system of the present invention, the support status determination unit may receive an input of an actual device support status from the user, and the support status determination unit may update the method for the support status determination on the basis of the actual device support status input from the user and the result of the support status determination corresponding to the actual device support status input from the user.

According to this configuration, the device support status notification system of the present invention updates the method for the support status determination on the basis of the actual device support status input from the user and the result of the support status determination corresponding to the actual device support status input from the user, so that accuracy of the support status determination can be improved.

In the device support status notification system of the present invention, the support status determination unit may instruct the user to input the actual device support status at a frequency in accordance with an accuracy rate of the support status determination based on the actual device support status input from the user and the result of the support status determination corresponding to the actual device support status input from the user.

According to this configuration, the device support status notification system of the present invention instructs the user to input the actual device support status at a frequency in accordance with the accuracy rate of the support status determination based on the actual device support status input from the user and the result of the support status determination corresponding to the actual device support status input from the user, so that it is possible to prevent the user from being instructed to input the actual device support status at an unnecessarily high frequency.

In the device support status notification system of the present invention, the support status determination unit may receive an input of a plan of the device support status from the user, and the support status determination unit may update the method for the support status determination on the basis of the plan of the device support status input from the user and the result of the support status determination corresponding to the plan of the device support status input from the user.

According to this configuration, the device support status notification system of the present invention updates the method for the support status determination on the basis of the plan of the device support status input from the user and the result of the support status determination corresponding to the plan of the device support status input from the user, so that accuracy of the support status determination can be improved.

In the device support status notification system of the present invention, the support status determination unit may instruct the user to input a plan of the device support status at a frequency in accordance with an accuracy rate of the support status determination based on the plan of the device support status input from the user and the result of the support status determination corresponding to the plan of the device support status input from the user.

According to this configuration, the device support status notification system of the present invention instructs the user to input the plan of the device support status at a frequency in accordance with the accuracy rate of the support status determination based on the plan of the device support status input from the user and the result of the support status determination corresponding to the plan of the device support status input from the user, so that it is possible to prevent the user from being instructed to input the plan of the device support status at an unnecessarily high frequency.

In the device support status notification system of the present invention, the information notification unit may make a notification of a period during which the device support status is a specific type of the device support status as the information for notification.

According to this configuration, the device support status notification system of the present invention notifies the user of the period during which the device support status is the specific type of the device support status, so that the user can recognize the period during which the device support status is the specific type of the device support status.

In the device support status notification system according to the present invention, the information notification unit may make a notification of at least one of a period during which the device support status is each of a plurality of types of the device support status or a ratio of the period during which the device support status is each of the plurality of types of the device support status as the information for notification.

According to this configuration, the device support status notification system of the present invention makes a notification of at least one of the period during which the device support status is each of the plurality of types of the device support status or the ratio of the period during which the device support status is each of the plurality of types of the device support status, so that in a case where the device support status is biased to one of the plurality of types of the device support status, the device support status notification system of the present invention can cause the user to recognize to which one of the plurality of types of the device support status, the device support status is biased and to what extent the device support status is biased.

In the device support status notification system of the present invention, the plurality of types of the device support status includes at least one of a combination of the device support status in which the electronic device is supported by a left arm of the user and the device support status in which the electronic device is supported by a right arm of the user, a combination of the device support status in which the electronic device is supported by the user on an upper side of a specific position in a vertical direction and the device support status in which the electronic device is supported by the user on a lower side of the specific position in the vertical direction, or a combination of the device support status in which the electronic device is supported by the user on a front side of a specific position in a front-back direction for the user and the device support status in which the electronic device is supported by the user on a back side of the specific position in the front-back direction.

According to this configuration, in a case where the device support status notification system of the present invention makes a notification of at least one of a period during which the device support status is each of a status in which the electronic device is supported by the left arm of the user and a status in which the electronic device is supported by the right aim of the user or a ratio of the period during which the device support status is each of the status in which the electronic device is supported by the left arm of the user and the status in which the electronic device is supported by the right arm of the user, when the device support status is biased to either the status in which the electronic device is supported by the left arm of the user or the status in which the electronic device is supported by the right arm of the user, the device support status notification system of the present invention can cause the user to recognize to which one of the status in which the electronic device is supported by the left arm of the user and the status in which the electronic device is supported by the right arm of the user, the device support status is biased and to what extent the device support status is biased. Further, in a case where the device support status notification system of the present invention makes a notification of at least one of a period during which the device support status is each of a status in which the electronic device is supported by the user on the upper side of the specific position in the vertical direction and a status in which the electronic device is supported by the user on the lower side of the specific position in the vertical direction or a ratio of the period during which the device support status is each of the status in which the electronic device is supported by the user on the upper side of the specific position in the vertical direction and the status in which the electronic device is supported by the user on the lower side of the specific position in the vertical direction, when the device support status is biased to either the status in which electronic device is supported by the user on the upper side of the specific position in the vertical direction or the status in which the electronic device is supported by the user on the lower side of the specific position in the vertical direction, the device support status notification system of the present invention can cause the user to recognize to which one of the status in which the electronic device is supported by the user on the upper side of the specific position in the vertical direction and the status in which the electronic device is supported by the user on the lower side of the specific position in the vertical direction, the device support status is biased and to what extent the device support status is biased. In addition, in a case where the device support status notification system of the present invention makes a notification of at least one of a period during which the device support status is each of a status in which the electronic device is supported by the user on the front side of the specific position in the front-back direction for the user and a status in which the electronic device is supported by the user on the back side of the specific position in the front-back direction for the user or a ratio of the period during which the device support status is each of the status in which the electronic device is supported by the user on the front side of the specific position in the front-back direction for the user and the status in which the electronic device is supported by the user on the back side of the specific position in the front-back direction for the user, when the device support status is biased to either the status in which the electronic device is supported by the user on the front side of the specific position in the front-back direction for the user or the status in which the electronic device is supported by the user on the back side of the specific position in the front-back direction for the user, the device support status notification system of the present invention can cause the user to recognize to which one of the status in which the electronic device is supported by the user on the front side of the specific position in the front-back direction for the user and the status in which the electronic device is supported by the user on the back side of the specific position in the front-back direction for the user, the device support status is biased and to what extent the device support status is biased.

In the device support status notification system of the present invention, the information notification unit may make a notification of a current device support status as the information for notification.

According to this configuration, the device support status notification system of the present invention notifies the user of the current device support status, so that the user can recognize the current device support status.

In the device support status notification system of the present invention, the information acquisition unit may acquire, as the information for determination, at least one of a position of the electronic device, an inclination of the electronic device, movement of the electronic device, a portion where the user contacts a housing of the electronic device, change in a state where the user contacts a touch panel in a case where the electronic device includes the touch panel, a fingerprint of the user acquired by the electronic device, a face image of the user supporting the electronic device captured by the electronic device, or irregularities of a face of the user supporting the electronic device detected by the electronic device.

According to this configuration, the device support status notification system of the present invention can improve accuracy of the support status determination.

A device support status notification program according to the present invention causes an electronic device to implement: a support status determination unit configured to execute support status determination on the basis of information for determination acquired by an information acquisition unit configured to acquire the information for determination that is information to be used for the support status determination that is determination of a device support status that is a status of support by a user, of the electronic device to be carried by the user and used by the user; and an information notification unit configured to make a notification of information for notification that is information based on a result of the support status determination executed by the support status determination unit.

According to this configuration, the electronic device that executes the device support status notification program of the present invention executes the support status determination on the basis of the information for determination acquired by the information acquisition unit and notifies the user of the information for notification based on the result of the executed support status determination, so that the user can recognize the device support status.

The device support status notification system and the device support status notification program of the present invention can cause a user of an electronic device to recognize a support status of the electronic device by the user.

BRIEF DESCRIPTION OF THE DRAWINGS

FIG. 6 is a view illustrating an example of result history information illustrated in FIG. 2;

FIG. 7 is a view illustrating an example of an instruction interval table illustrated in FIG. 2;

DETAILED DESCRIPTION

An Embodiment of the present invention will be described below using the drawings.

First, a configuration of a smartphone as an electronic device according to an embodiment of the present invention will be described.

Figure 1A:
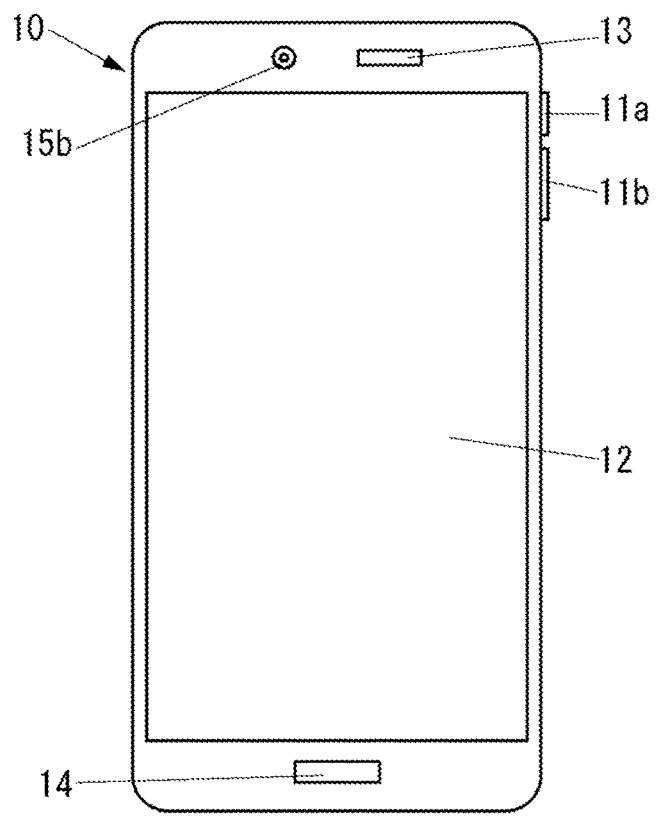
FIG. 1A is a front view of a smartphone according to an embodiment of the present invention.
Figure 1B:
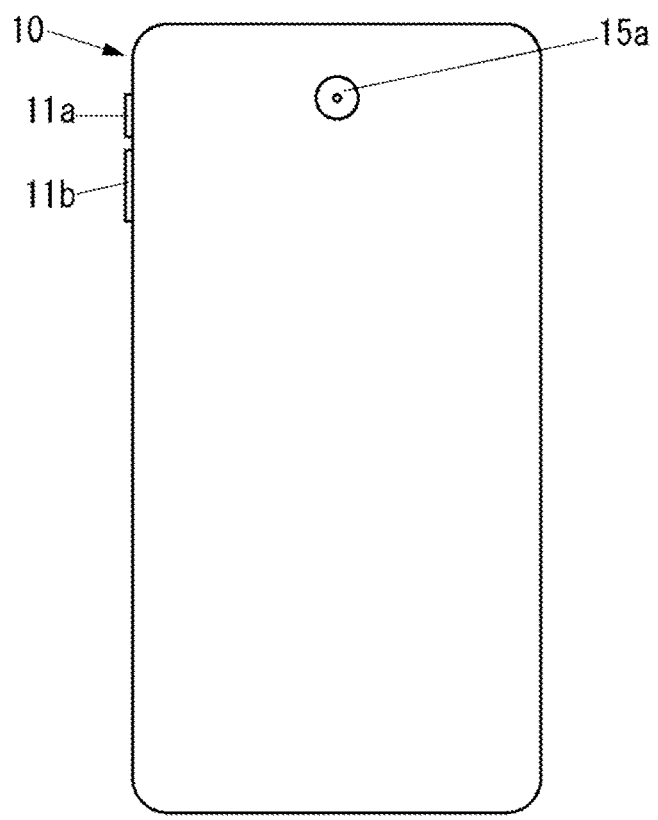
FIG. 1B is a rear view of the smartphone illustrated in FIG. 1A.
Figure 2:
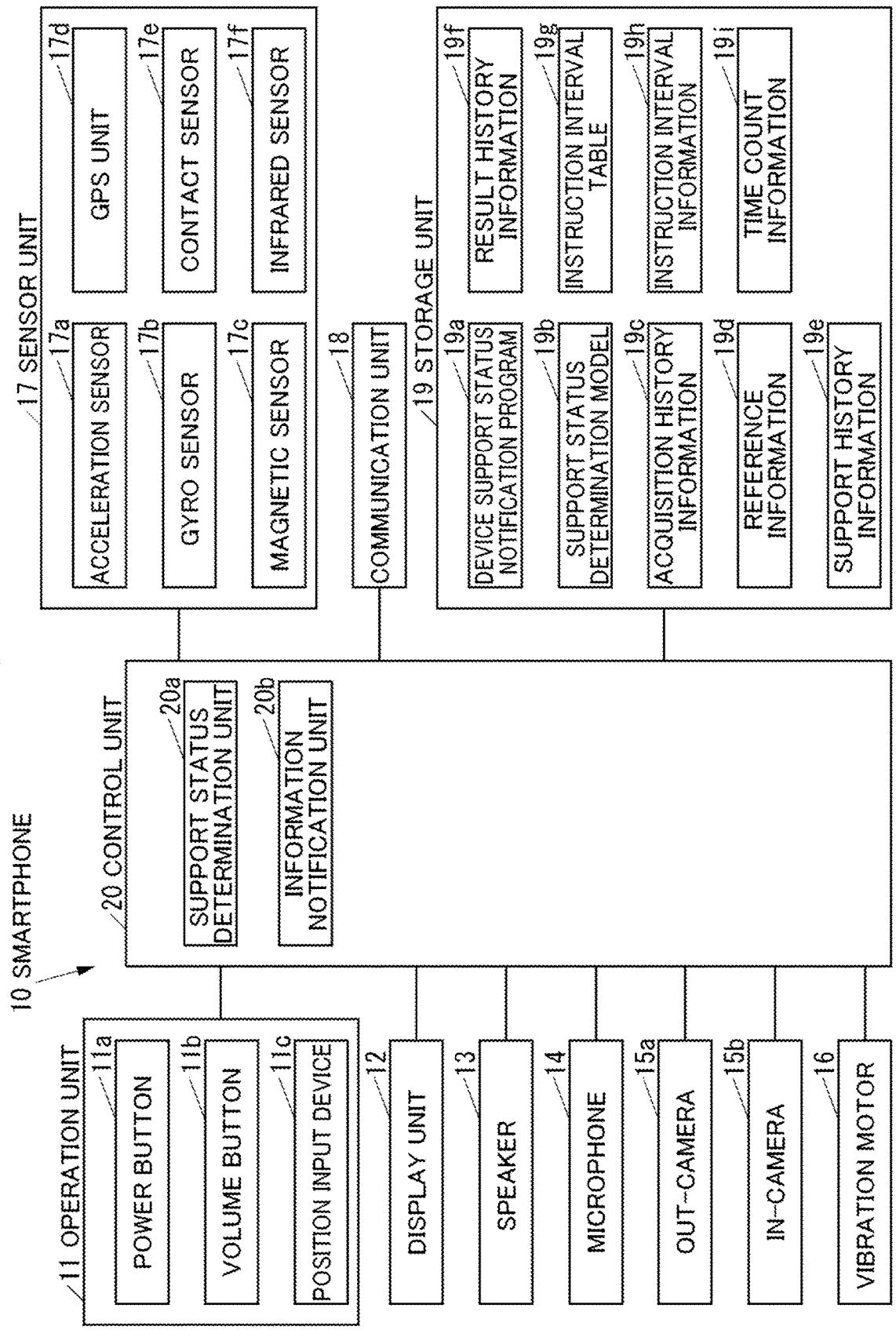
FIG. 2 is a block diagram illustrating a configuration of the smartphone illustrated in FIG. 1.

FIG. 1A is a front view of a smartphone 10 as the electronic device according to the present embodiment. FIG. 1B is a rear view of the smartphone 10. FIG. 2 is a block diagram illustrating a configuration of the smartphone 10.

As illustrated in FIGS. 1 and 2, the smartphone 10 includes an operation unit 11 serving as an information acquisition unit to which various kinds of operation are input, a display unit 12 serving as a display device such as an organic electro luminescence (EL) display that displays various kinds of information, a speaker 13 that outputs sound, a microphone 14 that inputs sound, an out-camera 15a that captures an image on a back side of the smartphone 10, an in-camera 15b serving as an information acquisition unit that captures an image on a front side of the smartphone 10, a vibration motor 16 that implements a vibration function, a sensor unit 17 serving as an information acquisition unit that detects various kinds of information, a communication unit 18 serving as a communication device that communicates with an external device via a network such as a local area network (LAN) and the Internet or directly in a wired or wireless manner without interposing a network, a storage unit 19 that is a nonvolatile storage device such as, for example, a semiconductor memory for storing various kinds of information, and a control unit 20 that controls the whole of the smartphone 10.

The operation unit 11 includes various kinds of operation devices. For example, the operation unit 11 includes a power button 11a for turning on the smartphone 10, a volume button 11b for adjusting a volume of sound to be output from the speaker 13, and a position input device 11c constituting a touch panel together with the display unit 12.

The sensor unit 17 includes various kinds of sensors. For example, the sensor unit 17 includes an acceleration sensor 17a that detects acceleration, a gyro sensor 17b that detects angular velocity, a magnetic sensor 17c that detects a magnitude and a direction of a magnetic field, a global positioning system (GPS) unit 17d that detects a current position, a contact sensor 17e that detects a contact portion with a housing of the smartphone 10, and an infrared sensor 17f that detects irregularities of the face of the user.

The storage unit 19 stores a device support status notification program 19a for making a notification of a support status of the smartphone 10 by the user (hereinafter, referred to as a "device support status"). For example, the device support status notification program 19a may be installed in the smartphone 10 at a manufacturing stage of the smartphone 10 or may be additionally installed in the smartphone 10 from the network.

The storage unit 19 stores a support status determination model 19b that is a machine learning model for executing determination of a status as to whether the smartphone 10 is supported by the left hand of the left arm or the right hand of the right arm of the user. The determination of a status as to whether the smartphone 10 is supported by the left hand of the left arm or the right hand of the right am of the user corresponds to determination of the device support status (hereinafter, referred to as "support status determination"). Hereinafter, the hand supporting the smartphone 10 refers to one of the left hand and the right hand that supports a large weight of the smartphone 10. For example, the support status determination model 19b may be installed in the smartphone 10 at the manufacturing stage of the smartphone 10 or may be additionally installed in the smartphone 10 from the network.

The support status determination model 19b can execute the support status determination on the basis of various kinds of information. For example, the support status determination model 19b can comprehensively determine the device support status on the basis of a position of the smartphone 10, inclination of the smartphone 10, movement such as shake of the smartphone 10, the contact portion with the housing of the smartphone 10, change in a contact state with the display unit 12 of the smartphone 10, fingerprint of the user acquired by the position input device 11c, the face image of the user captured by the in-camera 15b, and the irregularities of the face of the user detected by the infrared sensor 17f. In other words, the support status determination model 19b is a machine learning model that outputs a device support status in a case where at least one of the position of the smartphone 10, the inclination of the smartphone 10, the movement of the smartphone 10, the contact portion with the housing of the smartphone 10, the change in the contact state with the display unit 12 of the smartphone 10, the fingerprint of the user acquired by the position input device 11c, the face image of the user captured by the in-camera 15b, or the irregularities of the face of the user detected by the infrared sensor 17f is input.

An example of a method for support status determination based on the position of the smartphone 10 will be described.

Figure 3:
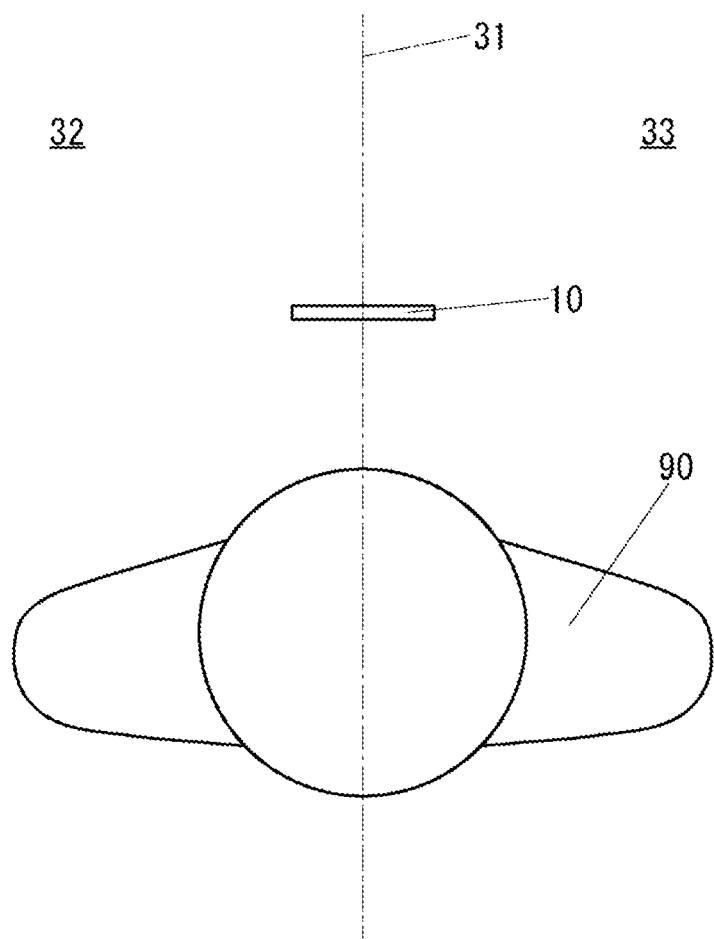
FIG. 3 is a view illustrating an example of a reference plane in a case where support status determination is executed on the basis of a position of the smartphone illustrated in FIG. 1.

FIG. 3 is a view illustrating an example of a reference plane 31 in a case where the support status determination is executed on the basis of the position of the smartphone 10.

FIG. 3 is a view in a case where the smartphone 10 and the user 90 are observed from above to below. The reference plane 31 illustrated in FIG. 3 is calculated on the basis of the position and orientation of the smartphone 10 indicated in reference information 19d which will be described later. In other words, the reference plane 31 is a vertical plane that passes through the center of the display unit 12 of the smartphone 10 at the position and orientation indicated by the reference information 19d and includes a straight line orthogonal to the display unit 12. In FIG. 3, a region on the left side with respect to the reference plane 31 in a case where the smartphone 10 is observed from the front side of the smartphone 10, that is, a region on the left side for the user 90 will be referred to as a left region 32, and a region on the right side with respect to the reference plane 31 in a case where the smartphone 10 is observed from the front side of the smartphone 10, that is, a region on the right side for the user 90 will be referred to as a right region 33.

For example, in a case where a current position of the smartphone 10 is included in the left region 32, it may be determined that the smartphone 10 is supported by the left hand of the user 90. Similarly, in a case where the current position of the smartphone 10 is included in the right region 33, it may be determined that the smartphone 10 is supported by the right hand of the user 90. Note that the control unit 20 may calculate the current position of the smartphone 10, for example, on the basis of outputs of the acceleration sensor 17*a*, the gyro sensor 17*b*, the magnetic sensor 17*c*, and the GPS unit 17*d*. The control unit 20 may calculate the current position of the smartphone 10 by another method such as beacon positioning or ultra wide band (UWB) positioning, for example.

An example of a method for support status determination based on the inclination of the smartphone 10 will be described.

Figure 4A:
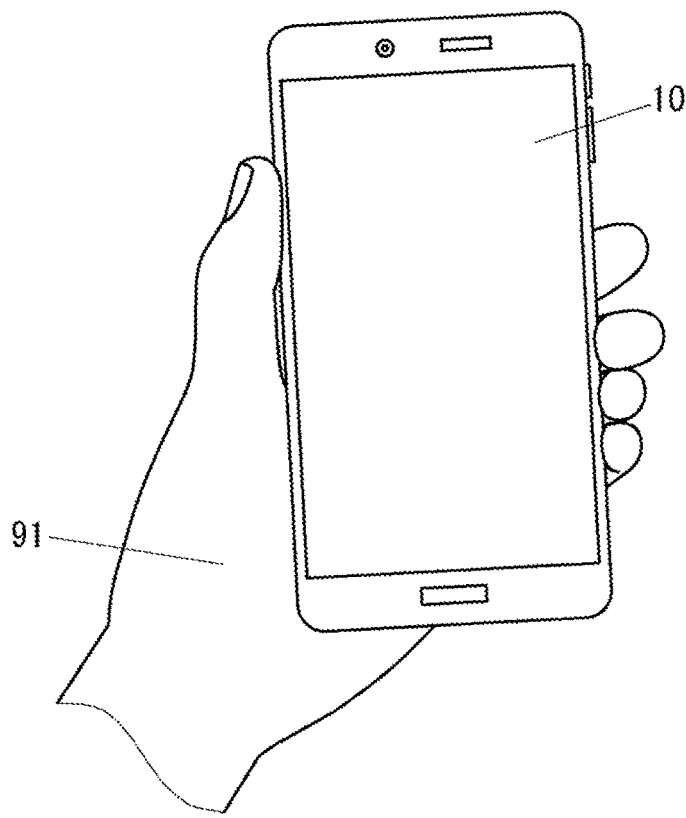
FIG. 4A is a view illustrating an example of the smartphone illustrated in FIG. 1 in a case where the smartphone is supported by the left hand of a user.
Figure 4B:
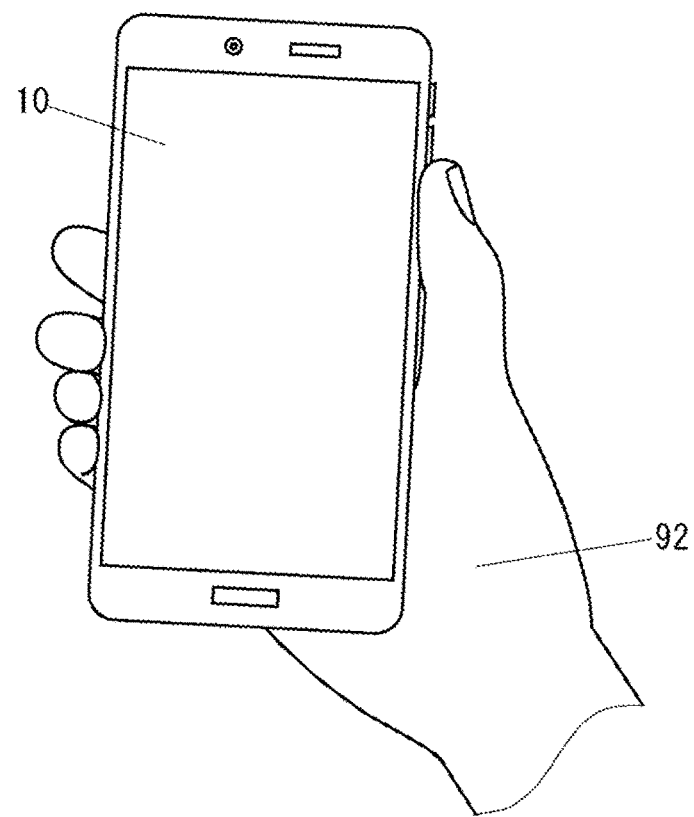
FIG. 4B is a view illustrating an example of the smartphone illustrated in FIG. 1 in a case where the smartphone is supported by the right hand of the user.

FIG. 4A is a view illustrating an example of the smartphone 10 supported by the left hand 91 of the user. FIG. 4B is a view illustrating an example of the smartphone 10 supported by the right hand 92 of the user.

FIGS. 4A and 4B are views in a case where the smartphone 10 is observed from the position of the user's eyes existing on the front side of the smartphone 10. As illustrated in FIG. 4A, in a case where the smartphone 10 is supported by the left hand 91 of the user, there is a high possibility that the smartphone 10 is slightly inclined to the left. As illustrated in FIG. 4B, in a case where the smartphone 10 is supported by the right hand 92 of the user, there is a high possibility that the smartphone 10 is slightly inclined to the right. Thus, for example, in a case where the smartphone 10 is inclined to the left, it may be determined that the smartphone 10 is supported by the left hand 91 of the user. Similarly, in a case where the smartphone 10 is inclined to the right, it may be determined that the smartphone 10 is supported by the fight hand 92 of the user. Note that the control unit 20 may calculate the current inclination of the smartphone 10, for example, on the basis of outputs of the acceleration sensor 17*a*, the gyro sensor 17*b*, and the magnetic sensor 17*c*. The control unit 20 may calculate the current inclination of the smartphone 10 by another method.

A method for support status determination based on the movement of the smartphone 10 will be described.

In a case where the smartphone 10 is supported by the left hand of the user, there is a high possibility that specific movement in a case where the smartphone 10 is supported by the left hand of the user, such as specific shake in a case where the smartphone 10 is supported by the left hand of the user, occurs in the smartphone 10. Similarly, in a case where the smartphone 10 is supported by the right hand of the user, there is a high possibility that specific movement in a case where the smartphone 10 is supported by the right hand of the user, such as specific shake in a case where the smartphone 10 is supported by the right hand of the user, occurs in the smartphone 10. Thus, for example, in a case where the specific movement in a case where the smartphone 10 is supported by the left hand of the user occurs in the smartphone 10, it may be determined that the smartphone 10 is supported by the left hand of the user. Similarly, in a case where the specific movement in a case where the smartphone 10 is supported by the right hand of the user occurs in the smartphone 10, it may be determined that the smartphone 10 is supported by the right hand of the user. Note that the control unit 20 may calculate the movement of the smartphone 10, for example, on the basis of outputs of the acceleration sensor 17*a*, the gyro sensor 17*b*, and the magnetic sensor 17*c*. The control unit 20 may calculate the movement of the smartphone 10 by another method.

An example of a method for support status determination based on the contact portion with the housing of smartphone 10 will be described.

In a case where the smartphone 10 is supported by the left hand 91 of the user as illustrated in FIG. 4A, there is a high possibility that the first finger of the left hand 91 is in contact with a left side surface of the smartphone 10, and the second finger, the third finger, the fourth finger, and the fifth finger of the left hand 91 are in contact with a right side surface of the smartphone 10. As illustrated in FIG. 4B, in a case where the smartphone 10 is supported by the right hand 92 of the user, there is a high possibility that the first finger of the right hand 92 is in contact with the light side surface of the smartphone 10, and the second finger, the third finger, the fourth finger, and the fifth finger of the right hand 92 are in contact with the left side surface of the smartphone 10. Thus, for example, in a case where the number of contact portions on the right side surface of the smartphone 10 is larger than the number of contact portions on the left side surface, or in a case where an area of the contact portion on the right side surface of the smartphone 10 is larger than an area of the contact portion on the left side surface, it may be determined that the smartphone 10 is supported by the left hand 91 of the user. Similarly, in a case where the number of contact portions on the left side surface of the smartphone 10 is larger than the number of contact portions on the right side surface, or in a case where the area of the contact portion on the left side surface of the smartphone 10 is larger than the area of the contact portion on the right side surface, it may be determined that the smartphone 10 is supported by the right hand 92 of the user. Note that the control unit 20 may calculate the number and area of contact portions with the housing of the smartphone 10, for example, on the basis of the output of the contact sensor 17*e*.

An example of a method for support status determination based on the change in the contact state with the display unit 12 of the smartphone 10 will be described.

The user may change the finger to be used for operation on the display unit 12 constituting the touch panel between in a case of supporting the smartphone 10 with the left hand and in a case of supporting the smartphone 10 with the right hand. Thus, in a case where the smartphone 10 is supported by the left hand of the user, when specific operation such as a flick input is executed on the display unit 12, there is a high possibility that specific change in a case where the smartphone 10 is supported by the left hand of the user, occurs in the contact state with the display unit 12 of the smartphone 10. Similarly, in a case where the smartphone 10 is supported by the right hand of the user, when specific operation is executed on the display unit 12, there is a high possibility that specific change in a case where the smartphone 10 is supported by the right hand of the user, occurs in the contact state with the display unit 12 of the smartphone 10. Thus, for example, in a case where specific operation is executed on the display unit 12, when the specific change in a case where the smartphone 10 is supported by the left hand of the user occurs in the contact state with the display unit 12, it may be determined that the smartphone 10 is supported by the left hand of the user. Similarly, when the specific change in a case where the smartphone 10 is supported by the right hand of the user occurs in the contact state with the display unit 12, it may be determined that the smartphone 10 is supported by the right hand of the user. Note that the control unit 20 may calculate the change in the contact state with the display unit 12, for example, on the basis of the output of the position input device 11c. The control unit 20 may calculate the change in the contact state with the display unit 12 by another method.

An example of a method for support status determination based on the fingerprint of the user will be described.

The user may input his/her own fingerprint to the position input device 11c for fingerprint authentication in a specific case such as in a case where the user logs into the smartphone 10. The user may change the finger to be used for fingerprint authentication between in a case of supporting the smartphone 10 with the left hand and in a case of supporting the smartphone 10 with the right hand. Thus, for example, when a fingerprint of a dedicated finger to be used for fingerprint authentication in a case where the smartphone 10 is supported by the left hand of the user is input to the position input device 11c, it may be determined that the smartphone 10 is supported by the left hand of the user. Similarly, when a fingerprint of a dedicated finger to be used for fingerprint authentication in a case where the smartphone 10 is supported by the right hand of the user is input to the position input device 11c, it may be determined that the smartphone 10 is supported by the right hand of the user.

An example of a method for support status determination based on the face image of the user will be described.

Figure 5A:
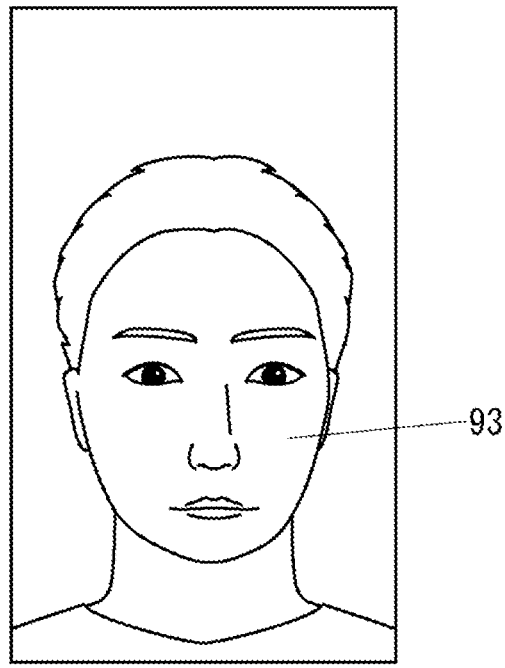
FIG. 5A is a view illustrating an example of a face image captured by an in-camera in a case where the smartphone illustrated in FIG. 1 is supported by the left hand of the user.
Figure 5B:
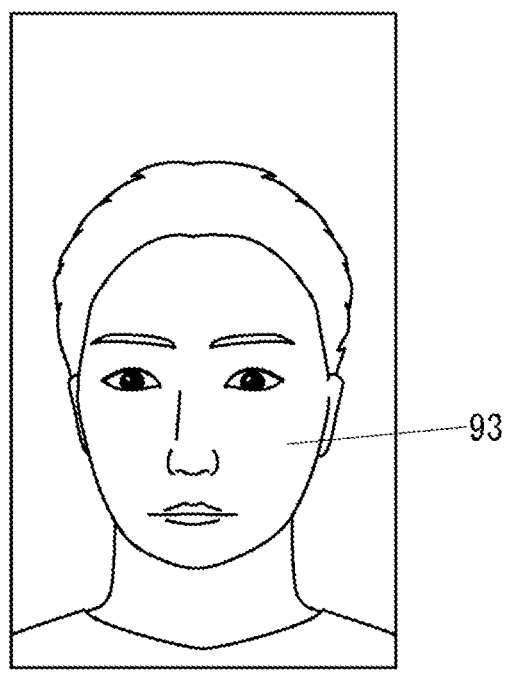
FIG. 5B is a view illustrating an example of a face image captured by the in-camera in a case where the smartphone illustrated in FIG. 1 is supported by the right hand of the user.

FIG. 5A is a view illustrating an example of the face image captured by the in-camera 15b (see FIG. 1) in a case where the smartphone 10 (see FIG. 1) is supported by the left hand of the user. FIG. 5B is a view illustrating an example of the face image captured by the in-camera 15b in a case where the smartphone 10 is supported by the right hand of the user.

The user may cause the in-camera 15b to capture the face image of the user for face authentication in a specific case such as in a case where the user logs into the smartphone 10. Here, in a case where the smartphone 10 is supported by the left hand of the user, when the face authentication is executed, there is a high possibility that the face 93 of the user in the face image captured by the in-camera 15b is slightly directed rightward as illustrated in FIG. 5A. On the other hand, in a case where the smartphone 10 is supported by the right hand of the user, when the face authentication is executed, there is a high possibility that the face 93 of the user in the face image captured by the in-camera 15b is slightly directed leftward as illustrated in FIG. 5B. Thus, for example, in a case where the face authentication is executed, when the face 93 of the user is directed rightward in the face image captured by the in-camera 15b, it may be determined that the smartphone 10 is supported by the left hand of the user. Similarly, in a case where the face authentication is executed, when the face 93 of the user is directed leftward in the face image captured by the in-camera 15b, it may be determined that the smartphone 10 is supported by the right hand of the user.

An example of a method for support status determination based on the irregularities of the face of the user will be described.

The user may cause the infrared sensor 17f to detect the irregularities of the face of the user for face authentication in a specific case such as in a case where the user logs into the smartphone 10. Here, in a case where the smartphone 10 is supported by the left hand of the user, when the face authentication is executed, the face of the user represented by the irregularities detected by the infrared sensor 17f is likely to be slightly directed rightward. On the other hand, in a case where the smartphone 10 is supported by the right hand of the user, when the face authentication is executed, the face of the user represented by the irregularities detected by the infrared sensor 17f is likely to be slightly directed leftward. Thus, for example, in a case where the face authentication is executed, when the face of the user represented by the irregularities detected by the infrared sensor 17f is directed rightward, it may be determined that the smartphone 10 is supported by the left hand of the user. Similarly, in a case where the face authentication is executed, when the face of the user represented by the irregularities detected by the infrared sensor 17f is directed leftward, it may be determined that the smartphone 10 is supported by the right hand of the user.

As illustrated in FIG. 2, the storage unit 19 can store acquisition history information 19c indicating history of outputs of the position input device 11c and outputs of various kinds of sensors of the sensor unit 17.

The storage unit 19 can store reference information 19d indicating the position and orientation of the smartphone 10, which serves as a reference of the position in the left-right direction for the user.

The storage unit 19 can store support history information 19e indicating history of the device support status.

The storage unit 19 can store result history information 19f indicating history of results of confirmation (hereinafter, referred to as "support status confirmation") of the device support status.

FIG. 6 is a view illustrating an example of the result history information 19f.

As illustrated in FIG. 6, the result history information 19f includes date and time of execution of the support status confirmation and a result indicating whether the result of the support status confirmation is correct or incorrect, for each support status confirmation.

As illustrated in FIG. 2, the storage unit 19 can store an instruction interval table 19g in which a tune interval (hereinafter, referred to as "instruction interval") for executing an instruction to the user is associated with an accuracy rate of the support status confirmation.

FIG. 7 is a view illustrating an example of the instruction interval table 19g.

In the instruction interval table 19g illustrated in FIG. 7, longer instruction intervals are associated with higher accuracy rates. The information illustrated in the instruction interval table 19g can be changed by the user.

As illustrated in FIG. 2, the storage unit 19 can store instruction interval information 19h indicating a current instruction interval.

The storage unit 19 can store time count information 19i for counting time. An initial value of the time indicated by the time count information 19i is 0.

The control unit 20 includes, for example, a central processing unit (CPU), a read only memory (ROM) that stores programs and various kinds of data, and a random access memory (RAM) as a memory to be used as a work area of the CPU of the control unit 20. The CPU of the control unit 20 executes a program stored in the storage unit 19 or the ROM of the control unit 20.

By executing the device support status notification program 19a, the control unit 20 implements a support status determination unit 20a that executes support status determination, and an information notification unit 20b that makes a notification of information based on a result of the support status determination executed by the support status determination unit 20a. In other words, the smartphone 10 constitutes a device support status notification system.

Next, operation of the smartphone 10 will be described.

First, an example of operation of the smartphone 10 in a case where the acquisition history information 19c is updated will be described.

Figure 8:
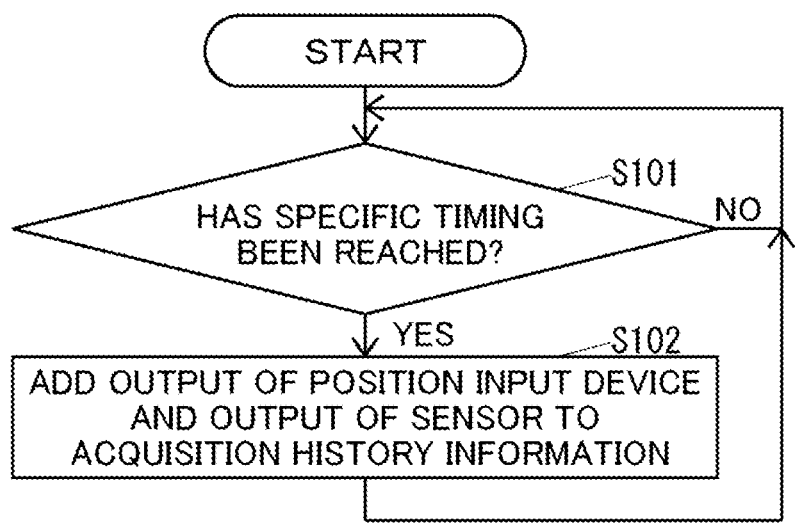
FIG. 8 is a flowchart of an example of operation of the smartphone illustrated in FIG. 1 in a case where acquisition history information is updated.

FIG. 8 is a flowchart illustrating an example of the operation of the smartphone 10 in a case where the acquisition history information 19c is updated.

The support status determination unit 20a executes the operation illustrated in FIG. 8 in a case where the smartphone 10 has been activated.

As illustrated in FIG. 8, the support status determination unit 20a determines whether or not a specific timing has been reached until it is determined that the specific timing has been reached (S101). Here, the specific timing in S101 is, for example, a timing of every 0.1 seconds.

When it is determined in S101 that the specific timing has been reached, the support status determination unit 20a adds the output of the position input device 11c and the outputs of the various kinds of sensors of the sensor unit 17 to the acquisition history information 19c (S102). After the processing in S102, the support status determination unit 20a executes the processing in S101.

Next, an example of the operation of the smartphone 10 in a case where the reference information 19d is updated will be described.

Figure 9:
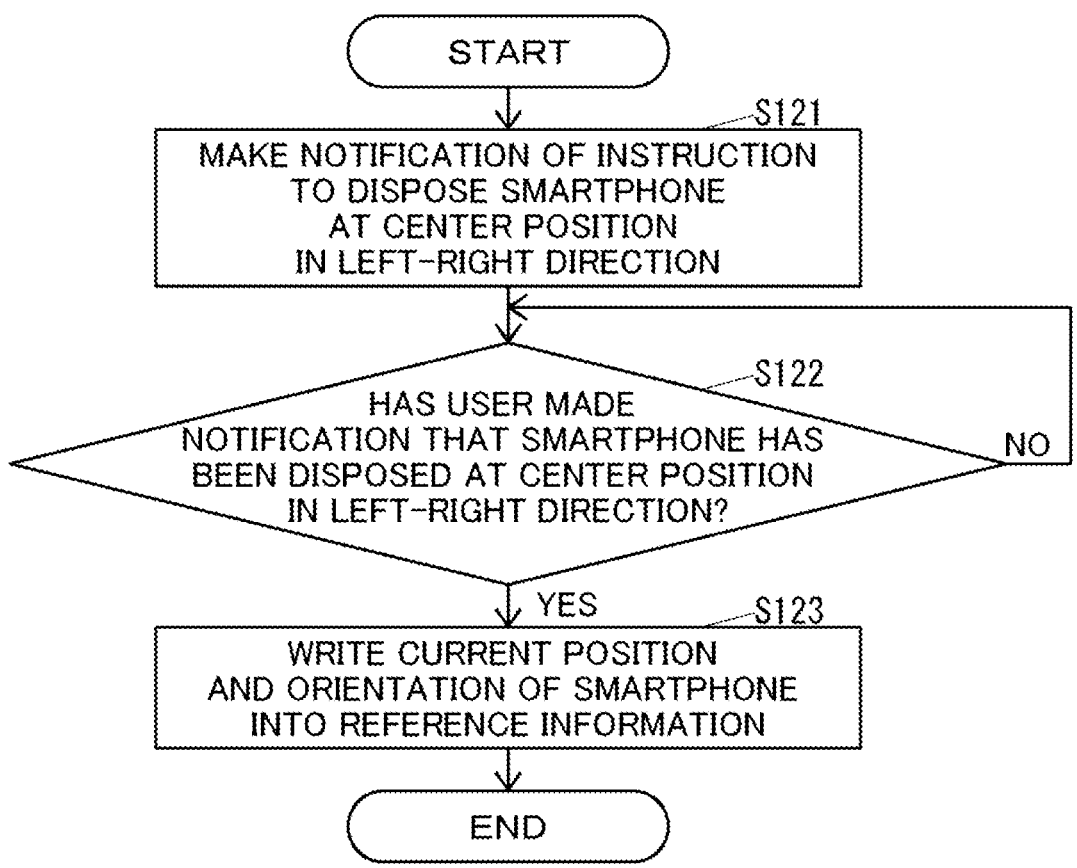
FIG. 9 is a flowchart of an example of operation of the smartphone illustrated in FIG. 1 in a case where reference information is updated.

FIG. 9 is a flowchart illustrating an example of the operation of the smartphone 10 in a case where the reference information 19d is updated.

The support status determination unit 20a executes the operation illustrated in FIG. 9 in a case where a specific timing has been reached. Here, the specific timing is, for example, a timing at which the user logs into the smartphone 10. The specific timing may be, for example, a timing at which the user gives an instruction to update the reference information 19d via the operation unit 11.

As illustrated in FIG. 9, the support status determination unit 20a notifies the user of an instruction to dispose the smartphone 10 at the center position in the left-right direction by at least one of display by the display unit 12 and output of sound by the speaker 13 (S121). This enables the user who has confirmed the notification in S121 to dispose the smartphone 10 at the center position in the left-right direction for the user.

After the processing in S121, until it is determined that the user has made a notification via the operation unit 11 that the smartphone 10 has been disposed at the center position in the left-right direction for the user, the support status determination unit 20a determines whether or not the user has made a notification via the operation unit 11 that the smartphone 10 has been disposed at the center position in the left-right direction for the user (S122).

In a case where it is determined in S122 that the user has made a notification via the operation unit 11 that the smartphone 10 has been disposed at the center position in the left-right direction for the user, the support status determination unit 20a writes the current position and orientation of the smartphone 10 detected by the various kinds of sensors of the sensor unit 17 into the reference information 19d (S123). Note that the support status determination unit 20a may calculate the current position of the smartphone 10, for example, on the basis of the outputs of the acceleration sensor 17a, the gyro sensor 17b, the magnetic sensor 17c, and the GPS unit 17d. The support status determination unit 20a may calculate the current position of the smartphone 10 by another method such as beacon positioning or UWB positioning, for example. In addition, the support status determination unit 20a may calculate the current orientation of the smartphone 10, for example, on the basis of the outputs of the gyro sensor 17b and the magnetic sensor 17c. The support status determination unit 20a may calculate the current orientation of the smartphone 10 by another method.

The support status determination unit 20a ends the operation illustrated in FIG. 9 after the processing in S123.

Next, an example of the operation of the smartphone 10 in a case where the support status determination model 19b is updated when the user logs into the smartphone 10 for the first time will be described.

Figure 10:
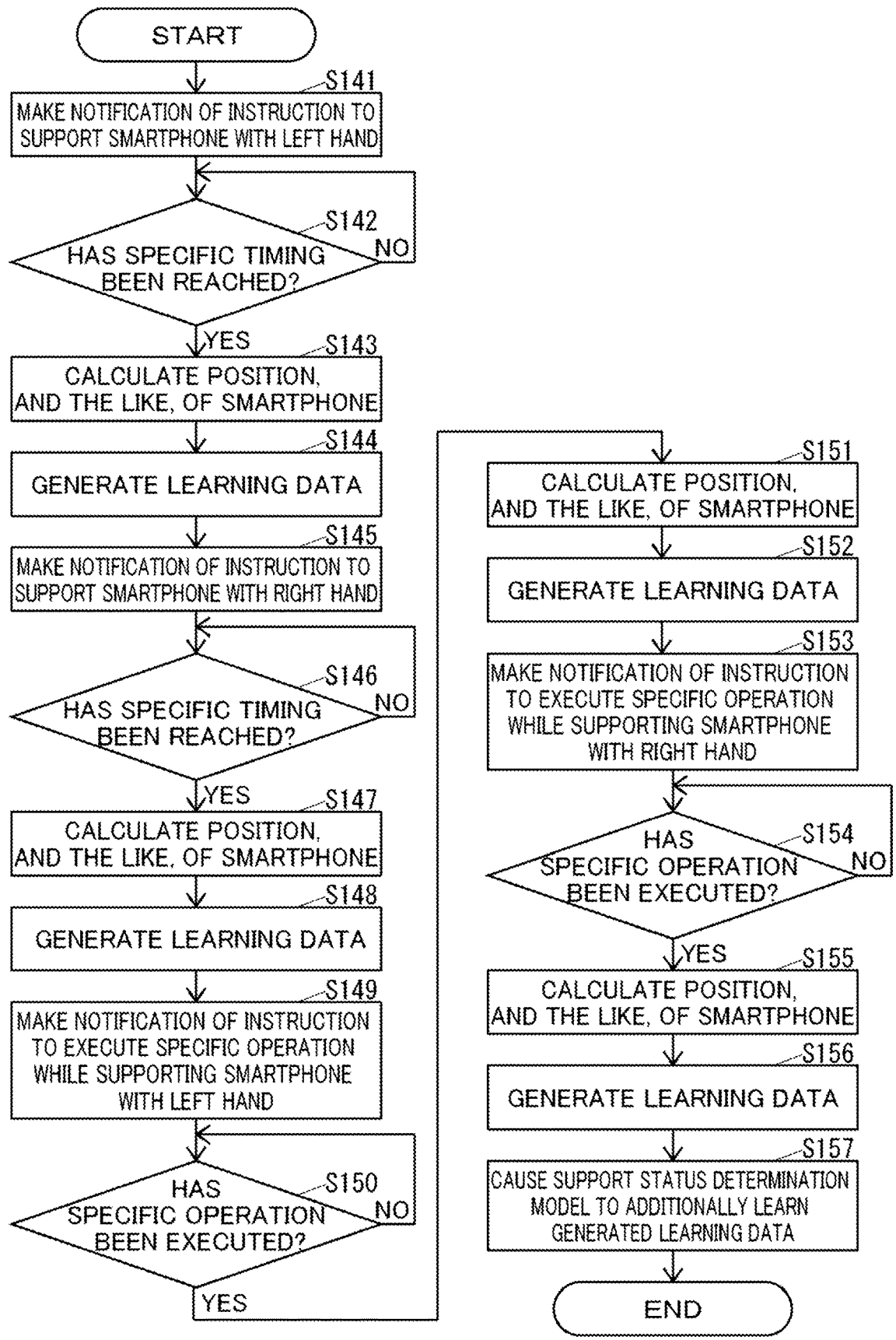
FIG. 10 is a flowchart of an example of operation of the smartphone illustrated in FIG. 1 in a case where a support status determination model is updated when the user logs into the smartphone for the first time.

FIG. 10 is a flowchart of an example of the operation of the smartphone 10 in a case where the support status determination model 19b is updated when the user logs into the smartphone 10 for the first time.

The support status determination unit 20a executes the operation illustrated in FIG. 10 when the user logs into the smartphone 10 for the first time.

As illustrated in FIG. 10, the support status determination unit 20a makes a notification of an instruction to support the smartphone 10 with the left hand by at least one of display by the display unit 12 and output of sound by the speaker 13 (S141). This enables the user who has confirmed the notification in S141 to support the smartphone 10 with the left hand.

After the processing in S141, the support status determination unit 20a determines whether or not a specific timing has been reached until it is determined that the specific timing has been reached (S142). Here, the specific timing in S142 is, for example, a timing at which 5 seconds have elapsed from the end of the processing in S141.

In a case where it is determined in S142 that the specific timing has been reached, the support status determination unit 20a calculates the position of the smartphone 10, the inclination of the smartphone 10, the movement of the smartphone 10, and the contact portion with the housing of the smartphone 10 at the tune when the specific timing has been reached, on the basis of the acquisition history information 19c and the reference information 19d (S143).

After the processing in S143, the support status determination unit 20a generates learning data by assigning, as a correct answer label, that the smartphone 10 is supported by the left hand of the user to the information calculated in S143 (S144).

After the processing in S144, the support status determination unit 20a makes a notification of an instruction to support the smartphone 10 with the right hand by at least one of display by the display unit 12 and output of sound by the speaker 13 (S145). This enables the user who has confirmed the notification in S145 to support the smartphone 10 with the right hand.

After the processing in S145, the support status determination unit 20a determines whether or not a specific timing has been reached until it is determined that the specific timing has been reached (S146). Here, the specific timing in S146 is, for example, a timing at which 5 seconds have elapsed from the end of the processing in S145.

In a case where it is determined in S146 that the specific timing has been reached, the support status determination unit 20a calculates the position of the smartphone 10, the inclination of the smartphone 10, the movement of the smartphone 10, and the contact portion with the housing of the smartphone 10 at the time when the specific timing has been reached, on the basis of the acquisition history information 19c and the reference information 19d (S147).

After the processing in S147, the support status determination unit 20a generates learning data by assigning, as a correct answer label, that the smartphone 10 is supported by the right hand of the user to the information calculated in S147 (S148).

After the processing in S148, the support status determination unit 20a makes a notification of an instruction to execute specific operation on the smartphone 10 while supporting the smartphone 10 with the left hand by at least one of display by the display unit 12 and output of sound by the speaker 13 (S149). This enables the user who has confirmed the notification in S149 to perform the specific operation notified in S149 on the smartphone 10 while supporting the smartphone 10 with the left hand. The specific operation notified in S149 may be, for example, operation of inputting specific characters such as "HELLO" from the touch panel.

After the processing in S149, until it is determined that the specific operation notified in S149 has been executed, the support status determination unit 20a determines whether or not the specific operation notified in S149 has been executed (S150).

In a case where it is determined in S150 that the specific operation notified in S149 has been executed, the support status determination unit 20a calculates the position of the smartphone 10, the inclination of the smartphone 10, the movement of the smartphone 10, the contact portion with the housing of the smartphone 10, and the change in the contact state with the display unit 12 of the smartphone 10 during execution of the specific operation notified in S149, on the basis of the acquisition history information 19c and the reference information 19d (S151).

After the processing in S151, the support status determination unit 20a generates learning data by assigning, as a correct answer label, that the smartphone 10 is supported by the left hand of the user to the information calculated in S151 (S152).

After the processing in S152, the support status determination unit 20a makes a notification of an instruction to execute specific operation on the smartphone 10 while supporting the smartphone 10 with the right hand by at least one of display by the display unit 12 and output of sound by the speaker 13 (S153). This enables the user who has confirmed the notification in S153 to perform the specific operation notified in S153 on the smartphone 10 while supporting the smartphone 10 with the right hand. The specific operation notified in S153 may be, for example, operation of inputting specific characters such as "HELLO" from the touch panel.

After the processing in S153, until it is determined that the specific operation notified in S153 has been executed, the support status determination unit 20a determines whether or not the specific operation notified in S153 has been executed (S154).

In a case where it is determined in S154 that the specific operation notified in S153 has been executed, the support status determination unit 20a calculates the position of the smartphone 10, the inclination of the smartphone 10, the movement of the smartphone 10, the contact portion with the housing of the smartphone 10, and the change in the contact state with the display unit 12 of the smartphone 10 during execution of the specific operation notified in S153, on the basis of the acquisition history information 19c and the reference information 19d (S155).

After the processing in S155, the support status determination unit 20a generates learning data by assigning, as a correct answer label, that the smartphone 10 is supported by the right hand of the user to the information calculated in S155 (S156).

After the processing in S156, the support status determination unit 20a causes the support status determination model 19b to additionally learn the learning data generated in S144, S148, S152, and S156 (S157). After the processing in S157, the support status determination unit 20a ends the operation illustrated in FIG. 10.

Next, an example of the operation of the smartphone 10 in a case where the support history information 19e is updated will be described.

Figure 11:
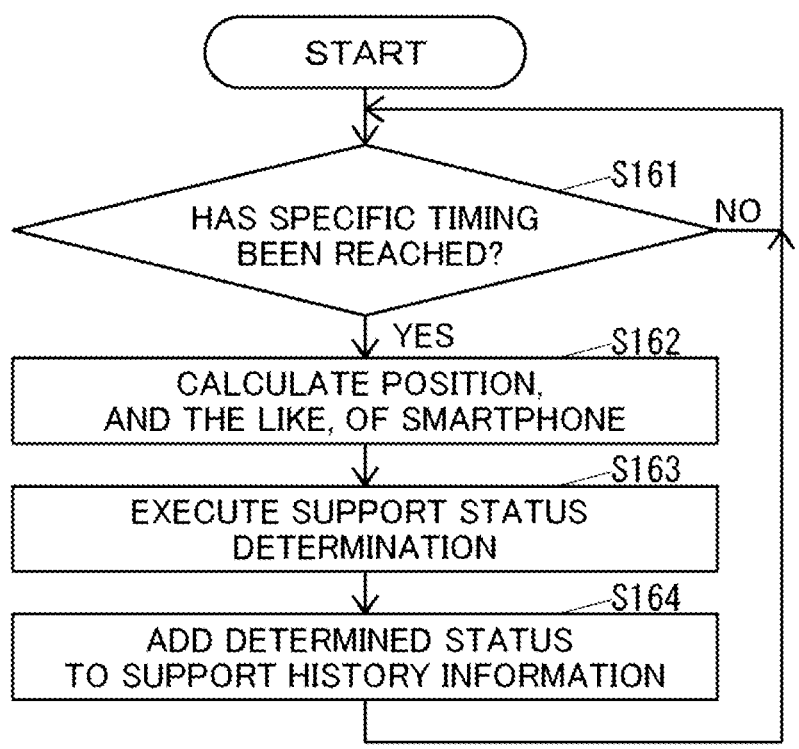
FIG. 11 is a flowchart of an example of operation of the smartphone illustrated in FIG. 1 in a case where support history information is updated.

FIG. 11 is a flowchart illustrating an example of the operation of the smartphone 10 in a case where the support history information 19e is updated.

The support status determination unit 20a executes the operation illustrated in FIG. 11 in a case where the user has logged into the smartphone 10.

As illustrated in FIG. 11, the support status determination unit 20a determines whether or not a specific timing has been reached until it is determined that the specific timing has been reached (S161). Here, the specific timing in S161 is, for example, a timing of every 0.1 seconds.

In a case where it is determined in S161 that the specific timing has been reached, the support status determination unit 20a calculates at least one of the position of the smartphone 10, the inclination of the smartphone 10, the movement of the smartphone 10, the contact portion with the housing of the smartphone 10, the change in the contact state with the display unit 12 of the smartphone 10, the fingerprint of the user acquired by the position input device 11c, the face image of the user captured by the in-camera 15b, and the irregularities of the face of the user detected by the infrared sensor 17f on the basis of at least one of the image captured by the in-camera 15b, the acquisition history information 19c or the reference information 19d (S162).

After the processing in S162, the support status determination unit 20a executes support status determination by inputting the information calculated in S162 to the support status determination model 19b (S163).

For example, the support status determination model 19b can comprehensively determine the device support status on the basis of the position of the smartphone 10, the inclination of the smartphone 10, the movement of the smartphone 10, the contact portion with the housing of the smartphone 10, the change in the contact state with the display unit 12 of the smartphone 10, the fingerprint of the user acquired by the position input device 11c, the face image of the user captured by the in-camera 15b, and the irregularities of the face of the user detected by the infrared sensor 17f.

After the processing in S163, the support status determination unit 20a adds the device support status determined in S163 to the support history information 19e (S164). After the processing in S164, the support status determination unit 20a executes the processing in S161.

Next, an example of the operation of the smartphone 10 in a case where the support status determination model 19b is updated by instructing the user to input an actual device support status after the user logs into the smartphone 10 will be described.

Figure 12:
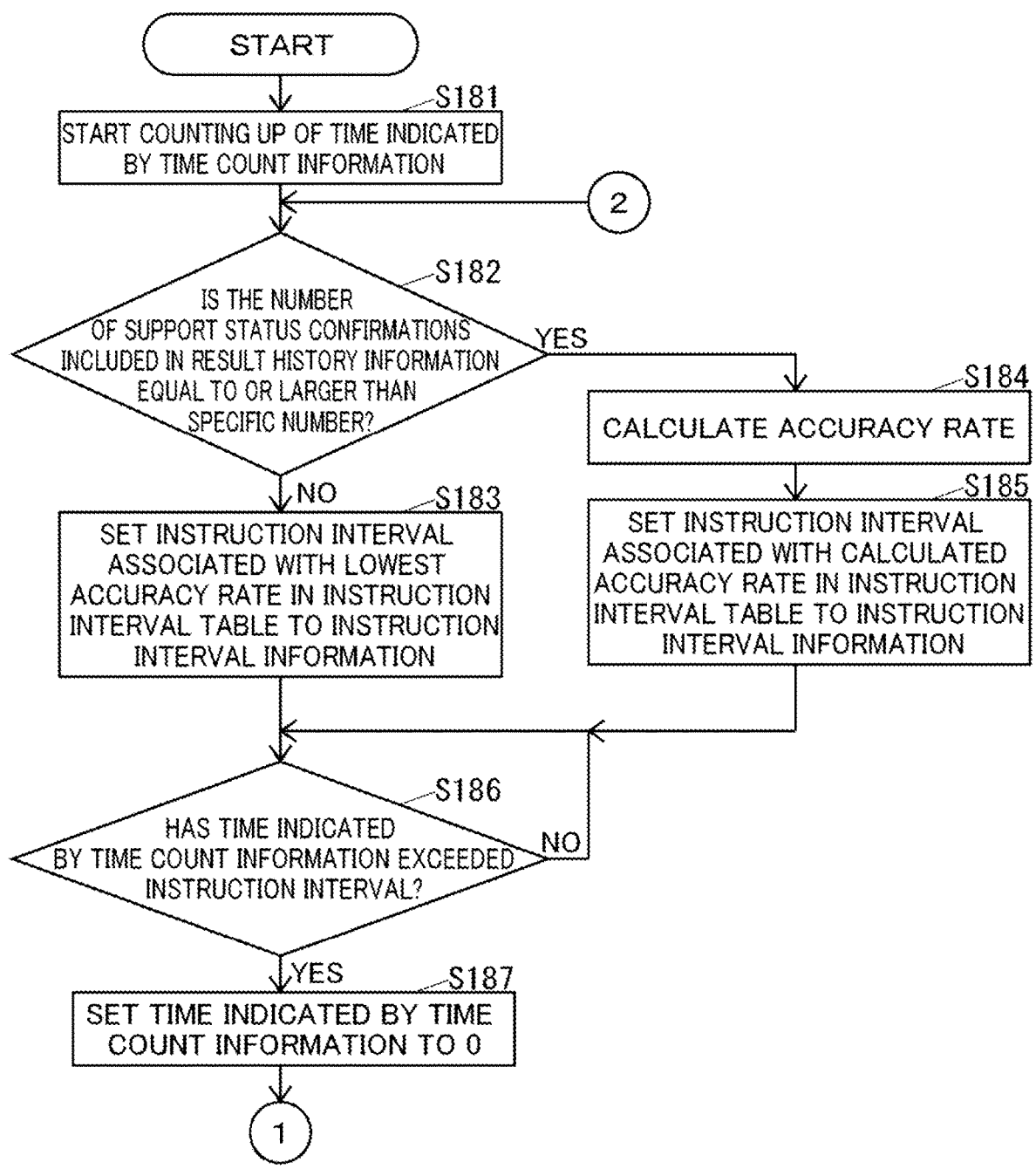
FIG. 12 is part of a flowchart of an example of operation of the smartphone illustrated in FIG. 1 in a case where the support status determination model is updated by instructing the user to input an actual device support status after the user logs into the smartphone.
Figure 13:
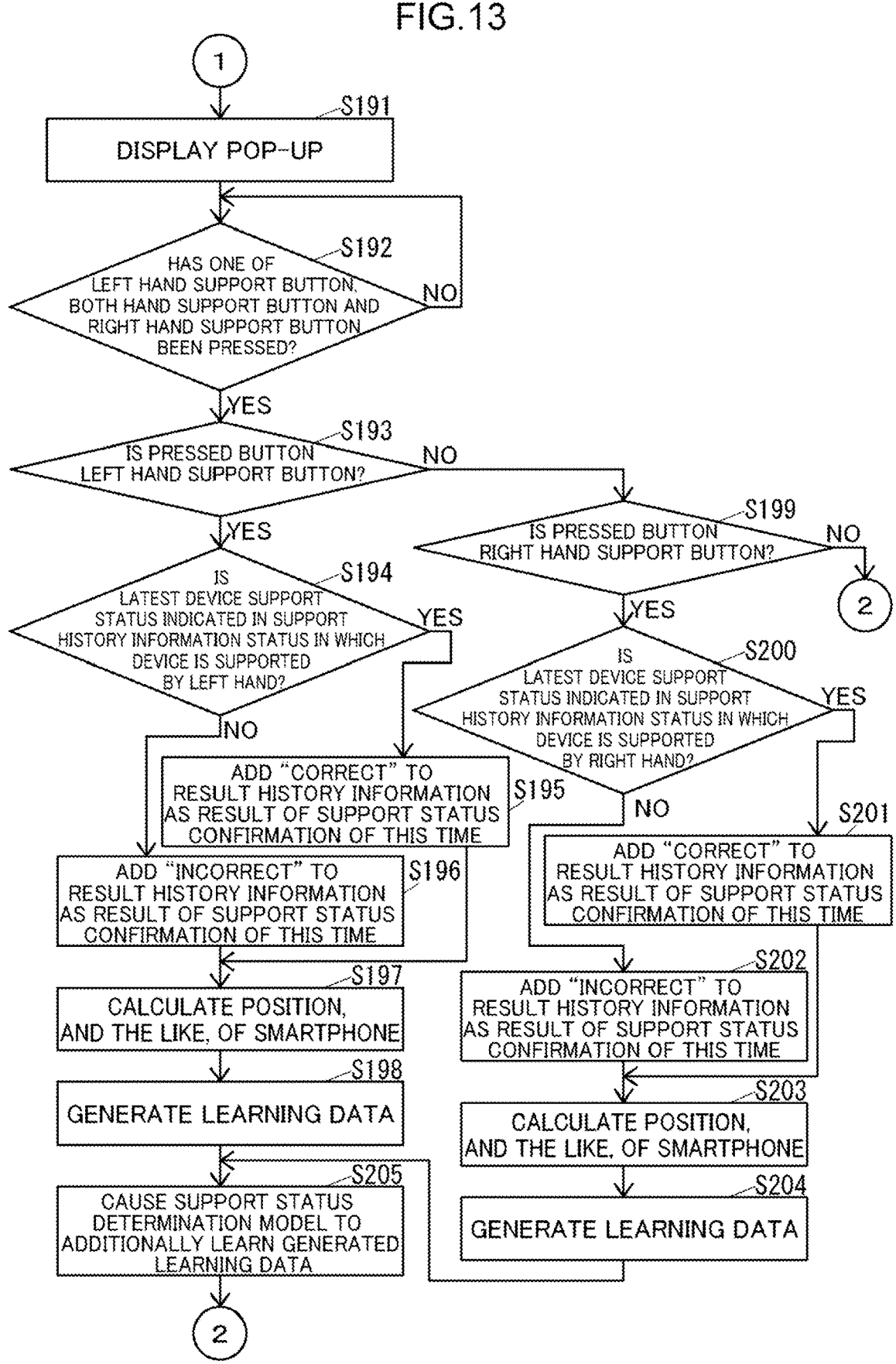
FIG. 13 is a flowchart subsequent to the flowchart illustrated in FIG. 12.

FIG. 12 is part of a flowchart of an example of the operation of the smartphone 10 in a case where the support status determination model 19b is updated by instructing the user to input the actual device support status after the user logs into the smartphone 10. FIG. 13 is a flowchart subsequent to the flowchart illustrated in FIG. 12.

The support status determination unit 20a executes the operation illustrated in FIGS. 12 and 13 after the user logs into the smartphone 10.

As illustrated in FIGS. 12 and 13, the support status determination unit 20a starts counting up of the time indicated by the time count information 19i (S181). Thereafter, the support status determination unit 20a continues counting up of the time indicated by the time count information 19i while executing the operation illustrated in FIGS. 12 and 13.

The support status determination unit 20a determines whether or not the number of support status confirmations included in the result history information 19f is equal to or larger than a specific number (S182). Here, the specific number is, for example, 10.

In a case where it is determined in S182 that the number of support status confirmations included in the result history information 19f is not equal to or larger than the specific number, the support status determination unit 20a sets the instruction interval associated with the lowest accuracy rate in the instruction interval table 19g to the instruction interval information 19h (S183).

In a case where it is determined in S182 that the number of support status confirmations included in the result history information 19f is equal to or larger than the specific number, the support status determination unit 20a calculates an accuracy rate by dividing the number of support status confirmations for which the result is correct among the support status confirmations included in the result history information 19f by the total number of the support status confirmations included in the result history information 19f (S184). Here, the support status determination unit 20a may execute calculation in S184 only for the support status confirmations in the latest specific period among the support status confirmations included in the result history information 19f. In other words, the support status determination unit 20a may calculate the accuracy rate by dividing the number of support status confirmations for which the result is correct among the support status confirmations in the latest specific period included in the result history information 19f by the total number of the support status confirmations in the latest specific period included in the result history information 19f. Here, the specific period may be, for example, one week.

The support status determination unit 20a sets the instruction interval associated with the accuracy rate calculated in S184 in the instruction interval table 19g to the instruction interval information 19h (S185).

After the processing in S183 or S185, until it is determined that the time indicated by the time count information 19i has exceeded the instruction interval indicated by the instruction interval information 19h, the support status determination unit 20a determines whether or not the time indicated by the time count information 19i has exceeded the instruction interval indicated by the instruction interval information 19h (S186).

In a case where it is determined in S186 that the time indicated by the time count information 19i has exceeded the instruction interval indicated by the instruction interval information 19h, the support status determination unit 20a sets the time indicated by the time count information 19i to 0 (S187). Here, as described above, the support status determination unit 20a continues counting up of the time indicated by the time count information 19i while executing the operation illustrated in FIGS. 12 and 13.

After the professing in S187, the support status determination unit 20a displays a pop-up for instructing the user to input a current actual device support status on the display unit 12 (S191).

Figure 14:
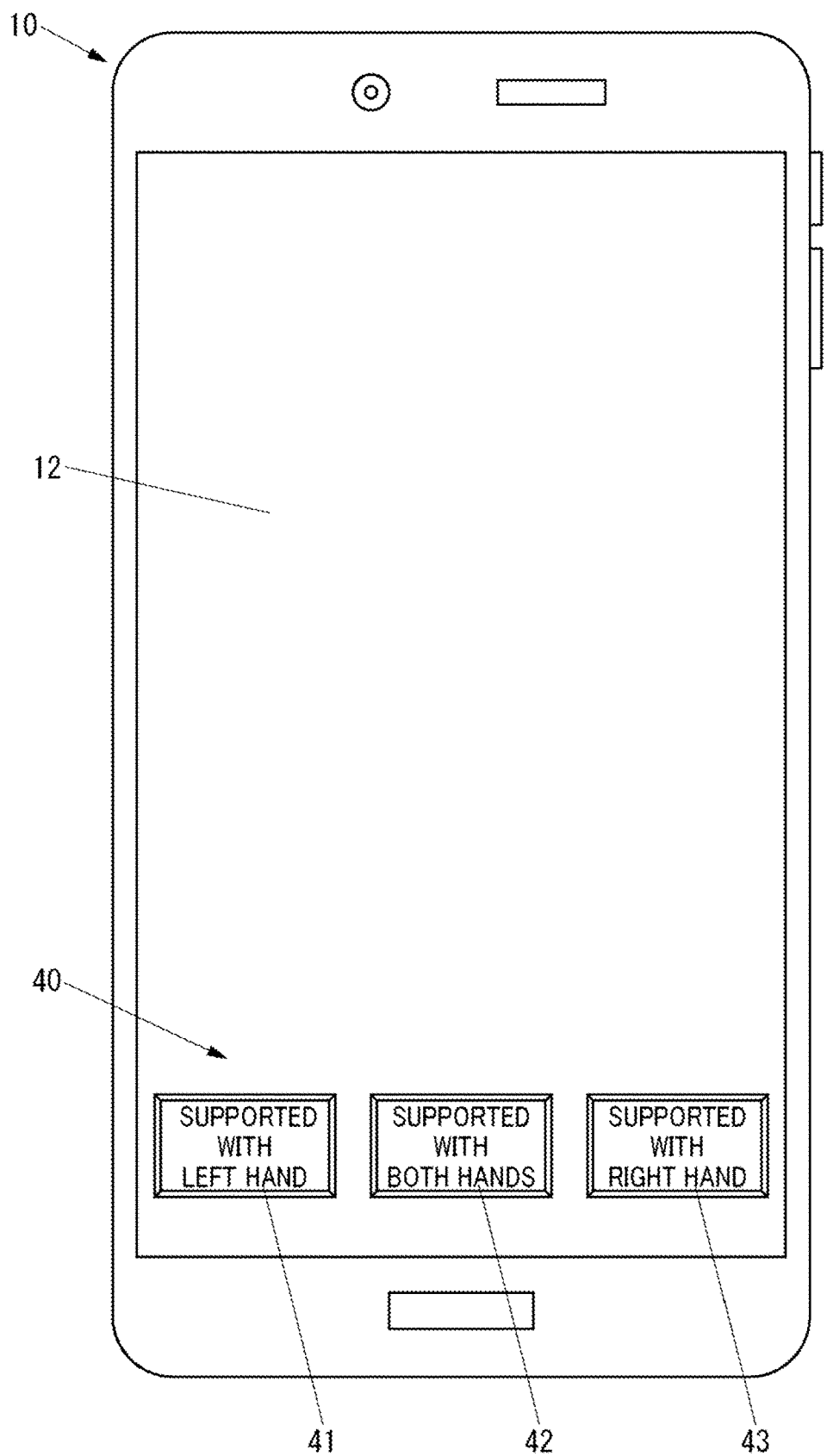
FIG. 14 is a view illustrating an example of the smartphone illustrated in FIG. 1 in a state in which a pop-up for instructing the user to input a current actual device support status is displayed.

FIG. 14 is a view illustrating an example of the smartphone 10 in a state in which a pop-up 40 for instructing the user to input the current actual device support status is displayed.

The pop-up 40 illustrated in FIG. 14 includes a left hand support button 41 for inputting a status in which the user is supporting the smartphone 10 with the left hand, a both hand support button 42 for inputting a status in which the user is supporting the smartphone 10 with both hands, and a light hand support button 43 for inputting a status in which the user is supporting the smartphone 10 with the fight hand.

The left hand support button 41 is displayed in a lower left region in a display range of the display unit 12 so that the user can easily press the button with the first finger of the left hand while supporting the smartphone 10 with the left hand. The right hand support button 43 is displayed in a lower right region in the display range of the display unit 12 so that the user can easily press the button with the first finger of the right hand while supporting the smartphone 10 with the right hand.

As illustrated in FIGS. 12 and 13, after the processing in S191, the support status determination unit 20a determines whether or not one of the left hand support button 41, the both hand support button 42, and the right hand support button 43 has been pressed until it is determined that one of the left hand support button 41, the both hand support button 42, and the right hand support button 43 has been pressed (S192).

In a case where it is determined in S192 that one of the left hand support button 41, the both hand support button 42, and the right hand support button 43 has been pressed, the support status determination unit 20a determines whether or not the pressed button is the left hand support button 41 (S193).

In a case where it is determined in S193 that the pressed button is the left hand support button 41, the support status determination unit 20a determines whether or not the latest device support status indicated in the support history information 19e is a status in which the smartphone 10 is supported by the left hand of the user (S194).

In a case where it is determined in S194 that the latest device support status indicated in the support history information 19e is a status in which the smartphone 10 is supported by the left hand of the user, the support status determination unit 20a adds "correct" to the result history information 19f as a result of the current support status confirmation (S195).

In a case where it is determined in S194 that the latest device support status indicated in the support history information 19e is not a status in which the smartphone 10 is supported by the left hand of the user, the support status determination unit 20a adds "incorrect" to the result history information 19f as a result of the current support status confirmation (S196).

After the processing in S195 or S196, the support status determination unit 20a calculates the position of the smartphone 10, the inclination of the smartphone 10, the movement of the smartphone 10, the contact portion with the housing of the smartphone 10, and the change in the contact state with the display unit 12 of the smartphone 10 in a specific period immediately before the left hand support button 41 is pressed, on the basis of the acquisition history information 19c and the reference information 19d (S197).

After the processing in S197, the support status determination unit 20a generates learning data by assigning, as a correct answer label, that the smartphone 10 is supported by the left hand of the user to the information calculated in S197 (S198).

In a case where it is determined that the pressed button is not the left hand support button 41 in S193, the support status determination unit 20a determines whether or not the pressed button is the right hand support button 43 (S199).

In a case where it is determined in S199 that the pressed button is the right hand support button 43, the support status determination unit 20a determines whether or not the latest device support status indicated in the support history information 19e is a status in which the smartphone 10 is supported by the right hand of the user (S200).

In a case where it is determined in S200 that the latest device support status indicated in the support history information 19e is a status in which the smartphone 10 is supported by the right hand of the user, the support status determination unit 20a adds "correct" to the result history information 19f as a result of the current support status confirmation (S201).

In a case where it is determined in S200 that the latest device support status indicated in the support history information 19e is not a status in which the smartphone 10 is supported by the right hand of the user, the support status determination unit 20a adds "incorrect" to the result history information 19f as a result of the current support status confirmation (S202).

After the processing in S201 or S202, the support status determination unit 20a calculates the position of the smartphone 10, the inclination of the smartphone 10, the movement of the smartphone 10, the contact portion with the housing of the smartphone 10, and the change in the contact state with the display unit 12 of the smartphone 10 in a specific period immediately before the right hand support button 43 is pressed, on the basis of the acquisition history information 19c and the reference information 19d (S203).

After the processing in S203, the support status determination unit 20a generates learning data by assigning, as a correct answer label, that the smartphone 10 is supported by the right hand of the user to the information calculated in S203 (S204).

After the processing in S198 or S204, the support status determination unit 20a causes the support status determination model 19b to additionally learn the learning data generated in S198 or S204 (S205).

In a case where it is determined in S199 that the pressed button is not the right hand support button 43 or in a case where the processing in S205 is ended, the support status determination unit 20a executes the processing in S182.

Next, an example of the operation of the smartphone 10 in a case where the support status determination model 19b is updated in accordance with an instruction from the user will be described.

Figure 15:
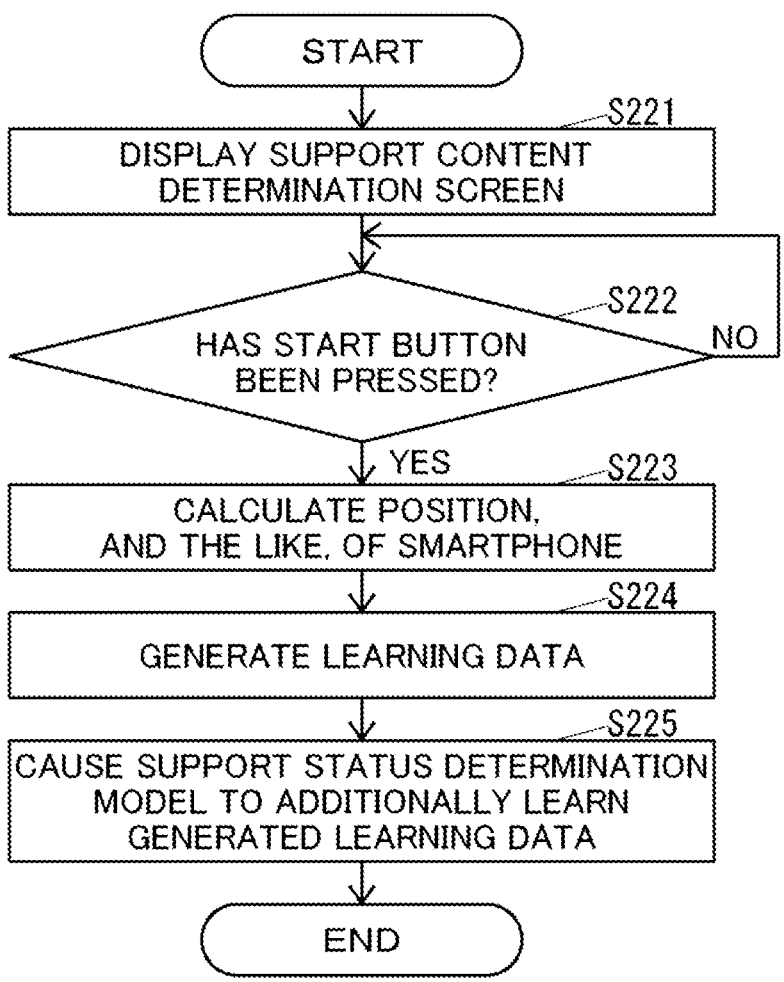
FIG. 15 is a flowchart of an example of operation of the smartphone illustrated in FIG. 1 in a case where the support status determination model is updated in accordance with an instruction from the user.

FIG. 15 is a flowchart of an example of the operation of the smartphone 10 in a case where the support status determination model 19b is updated in accordance with an instruction from the user.

When an instruction to start the processing of updating the support status determination model 19b is given by the user, the support status determination unit 20a executes the operation illustrated in FIG. 15.

As illustrated in FIG. 15, the support status determination unit 20a displays, on the display unit 12, a support content determination screen 50 (see FIG. 16) for determining how the smartphone 10 is supported by the user (S221).

Figure 16:
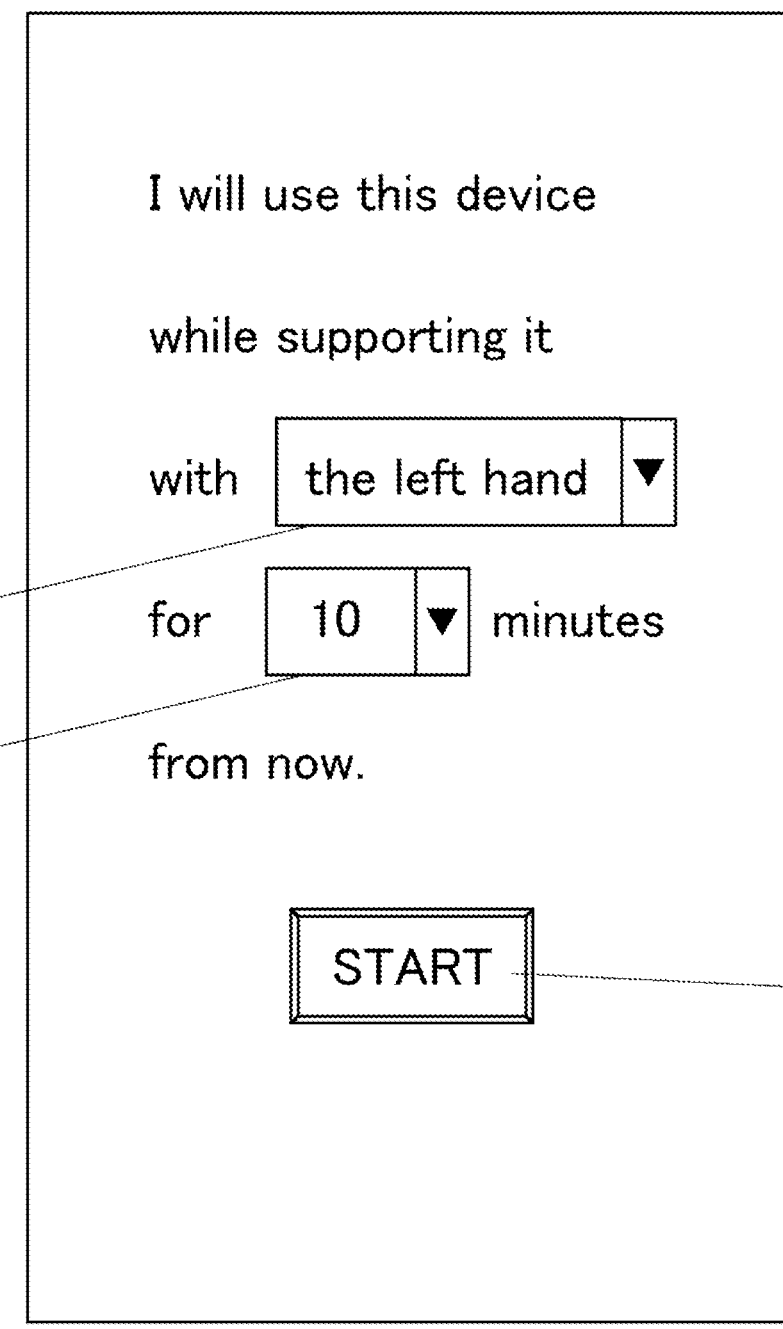
FIG. 16 is a view illustrating an example of a support content determination screen displayed in the operation illustrated in FIG. 15.

FIG. 16 is a view illustrating an example of the support content determination screen 50.

The support content determination screen 50 illustrated in FIG. 16 includes a drop-down list 51 for specifying a period during which the user supports the smartphone 10, a drop-down list 52 for specifying with which one of the left hand and the right hand the user supports the smartphone 10, and a start button 53 for the user to start supporting the smartphone 10 with the content specified by the drop-down lists 51 and 52.

As illustrated in FIG. 15, after the processing in S221, the support status determination unit 20a determines whether or not the start button 53 has been pressed until it is determined that the start button 53 has been pressed (S222).

In a case where it is determined in S222 that the start button 53 has been pressed, the support status determination unit 20a calculates the position of the smartphone 10, the inclination of the smartphone 10, the movement of the smartphone 10, the contact portion with the housing of the smartphone 10, and the change in the contact state with the display unit 12 of the smartphone 10 during a period from when it has been determined in S222 that the start button 53 has been pressed until when the period specified by the drop-down list 51 has elapsed, on the basis of the acquisition history information 19c and the reference information 19d (S223).

After the processing in S223, the support status determination unit 20a generates learning data by assigning, as a correct answer label, that the smartphone 10 is supported by the left hand or the right hand of the user, specified by the drop-down list 52, to the information calculated in S223 (S224).

After the processing in S224, the support status determination unit 20a causes the support status determination model 19b to additionally learn the learning data generated in S224 (S225). After the processing in S225, the support status determination unit 20a ends the operation illustrated in FIG. 15.

Next, an example of the operation of the smartphone 10 in a case where notifications of a total period (hereinafter, referred to as a "left hand use period") during which the smartphone 10 is used while being supported by the left hand of the user in a specific period, a total period (hereinafter, referred to as a "right hand use period") during which the smartphone 10 is used while being supported by the right hand of the user in a specific period, a ratio of the left hand use period (hereinafter, referred to as a "left hand use ratio") with respect to the total of the left hand use period and the right hand use period, and a ratio of the right hand use period (hereinafter, referred to as a "right hand use ratio") with respect to the total of the left hand use period and the right hand use period are made will be described.

Figure 17:
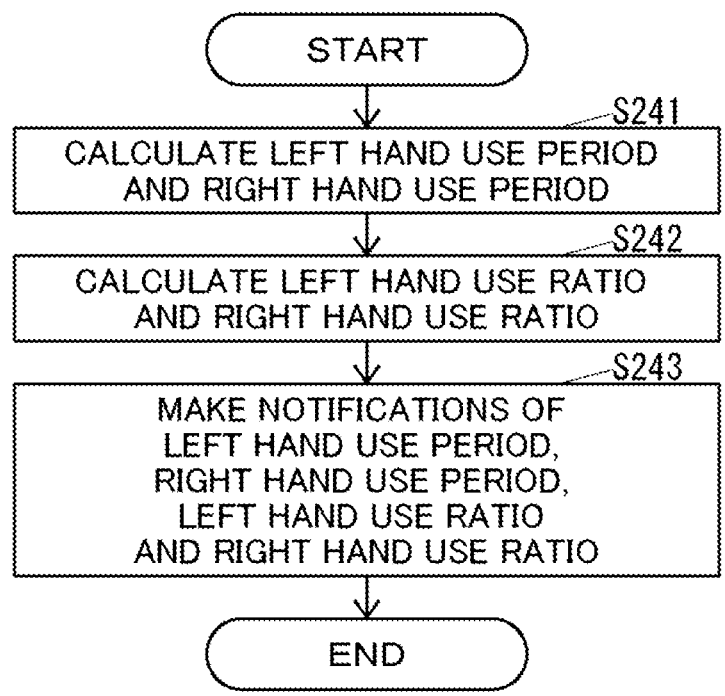
FIG. 17 is a flowchart of an example of operation of the smartphone illustrated in FIG. 1 in a case where notifications of a left hand use period, a right hand use period, a left hand use ratio, and a right hand use ratio are made.

FIG. 17 is a flowchart of an example of the operation of the smartphone 10 in a case where notifications of the left hand use period, the right hand use period, the left hand use ratio, and the right hand use ratio are made.

The information notification unit 20b executes the operation illustrated in FIG. 17 at a specific timing such as a timing at which the user gives an instruction to make notifications of the left hand use period, the right hand use period, the left hand use ratio, and the right hand use ratio.

As illustrated in FIG. 17, the information notification unit 20b calculates the left hand use period and the right hand use period on the basis of the support history information 19e (S241). The device support status to be calculated in S241 may be the device support status in the whole period from the first activation of the smartphone 10 to the present or may be the device support status in the latest specific period among the period from the first activation of the smartphone 10 to the present. Here, the specific period may be, for example, one week.

After the processing in S241, the information notification unit 20b calculates the left hand use ratio and the right hand use ratio on the basis of the left hand use period and the right hand use period calculated in S241 (S242). For example, in a case where the left hand use period and the right hand use period calculated in S241 are 2 hours and 8 hours, respectively, the information notification unit 20b calculates 20% and 80% as the left hand use ratio and the right hand use ratio, respectively, in S242.

After the processing in S242, the information notification unit 20b makes notifications of the left hand use period and the right hand use period calculated in S241 and the left hand use ratio and the right hand use ratio calculated in S242 by at least one of display by the display unit 12 and output of the sound by the speaker 13 (S243). After the processing in S243, the information notification unit 20b ends the operation illustrated in FIG. 17.

This enables the user who has confirmed the notifications in S243 to consciously determine which one of the left hand and the right hand is used to support the smartphone 10, for example, so that the left hand use ratio and the right hand use ratio become uniform.

As described above, the support status determination unit 20a updates the support status determination model 19b when the user logs into the smartphone 10 for the first time (see FIG. 10). However, the support status determination unit 20a does not have to update the support status determination model 19b when the user logs into the smartphone 10 for the first time. The support status determination unit 20a may be able to set whether or not to update the support status determination model 19b when the user logs into the smartphone 10 for the first time in accordance with an instruction from the user.

As described above, the support status determination unit 20a updates the support status determination model 19b by instructing the user to input an actual device support status after the user logs into the smartphone 10 (see FIGS. 12 and 13). However, the support status determination unit 20a may update the support status determination model 19b after the user logs into the smartphone 10 by a method other than the method of instructing the user to input the actual device support status after the user logs into the smartphone 10. For example, the support status determination unit 20a may update the support status determination model 19b by instructing the user of the device support status after the user logs into the smartphone 10.

Figure 18:
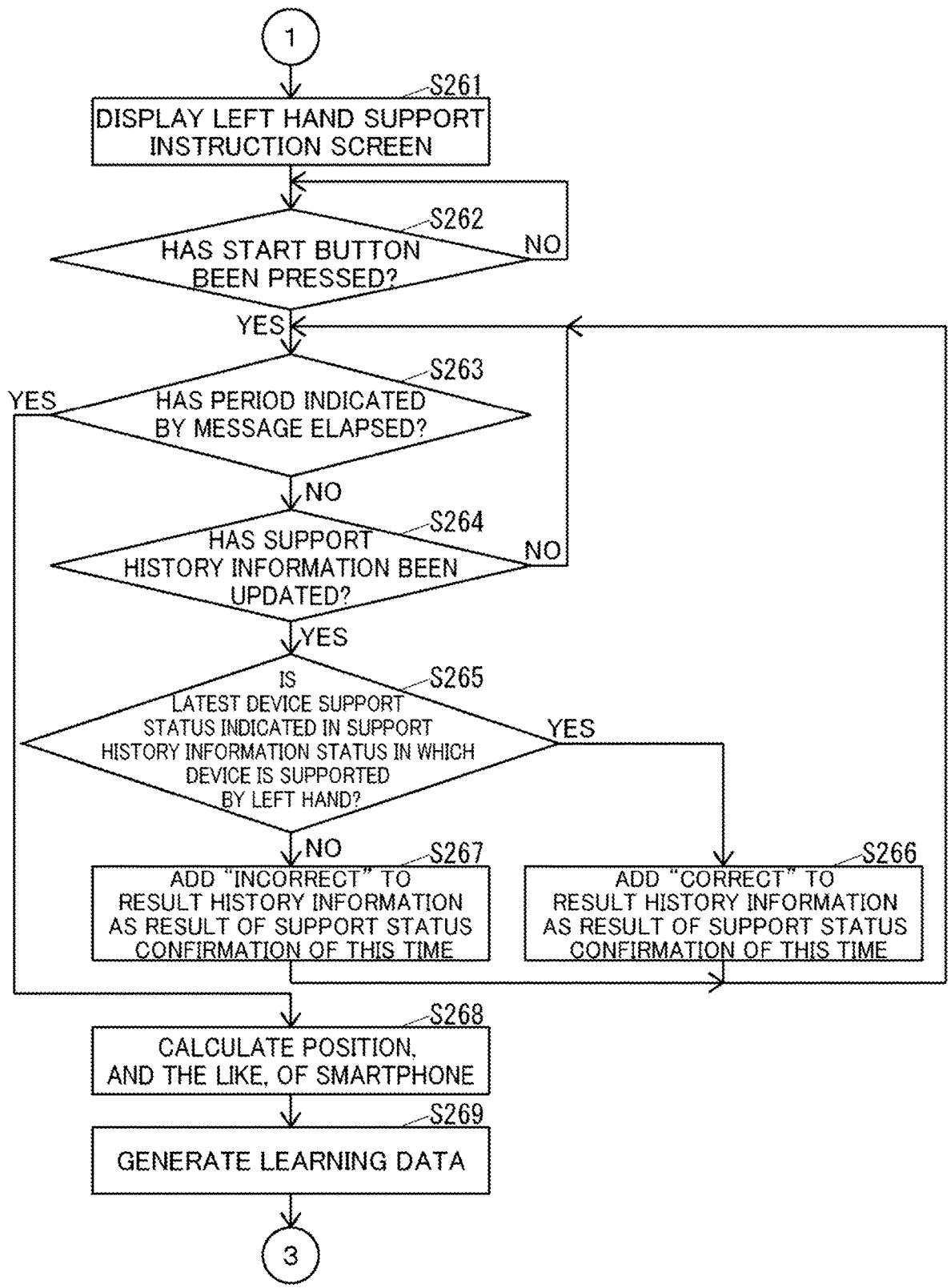
FIG. 18 is part of a flowchart of operation of the smartphone illustrated in FIG. 1 in a case where the support status determination model is updated by instructing the user of the device support status after the user logs into the smartphone.
Figure 19:
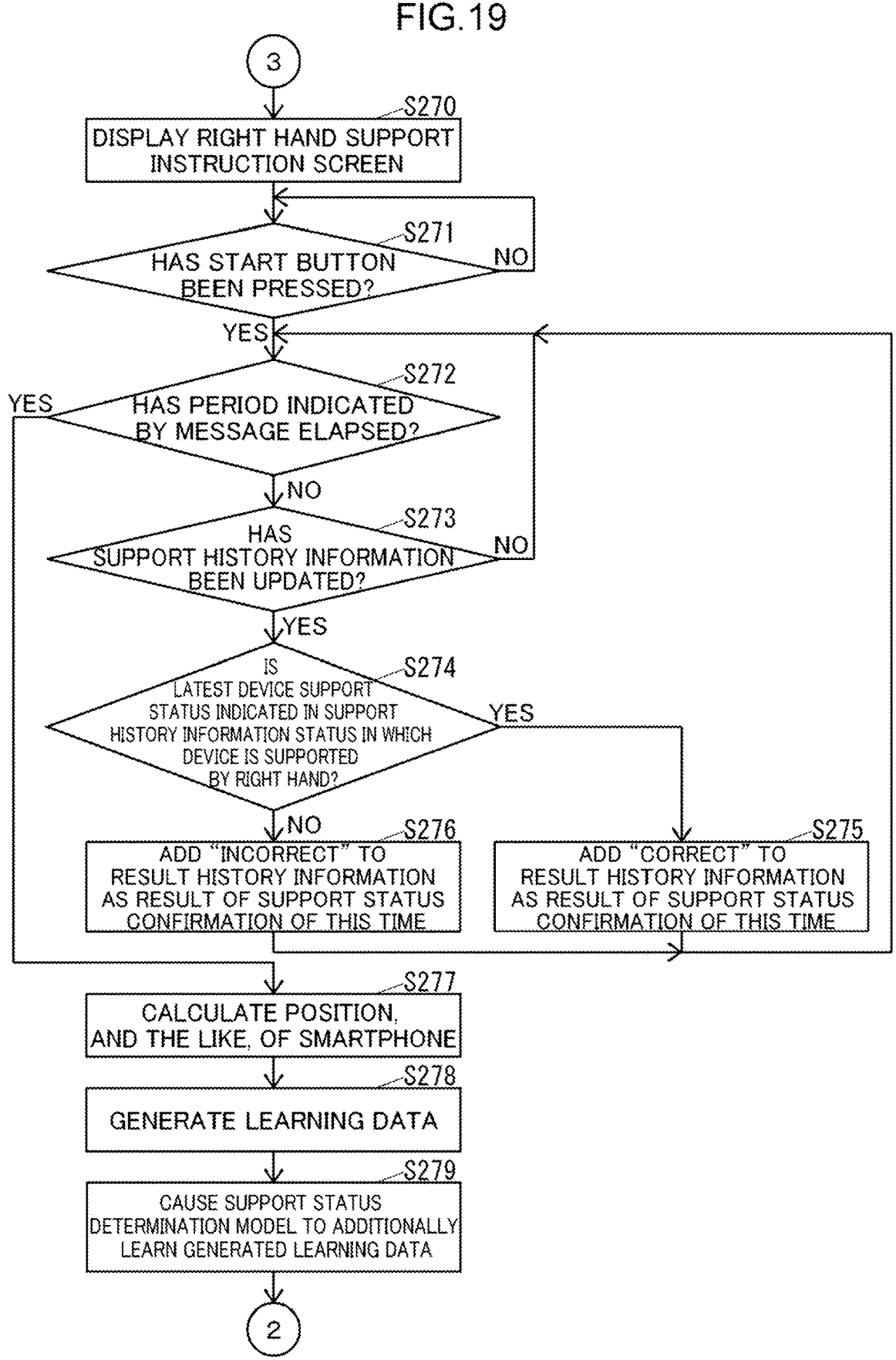
FIG. 19 is a flowchart subsequent to the flowchart illustrated in FIG. 18.

FIG. 18 is part of a flowchart of the operation of the smartphone 10 in a case where the support status determination model 19b is updated by instructing the user of the device support status after the user logs into the smartphone 10. FIG. 19 is a flowchart subsequent to the flowchart illustrated in FIG. 18.

The support status determination unit 20a executes the operation illustrated in FIGS. 12, 18, and 19 after the user logs into the smartphone 10. In other words, the support status determination unit 20a executes the operation illustrated in FIGS. 18 and 19 instead of the operation illustrated in FIG. 13.

As illustrated in FIGS. 12, 18, and 19, the support status determination unit 20a executes the processing in S181 to S187 (see FIG. 12).

After the processing in S187, the support status determination unit 20a displays, on the display unit 12, a left hand support instruction screen 60 (see FIG. 20) for instructing the user to use the smartphone 10 while supporting the smartphone 10 with the left hand (S261).

Figure 20:
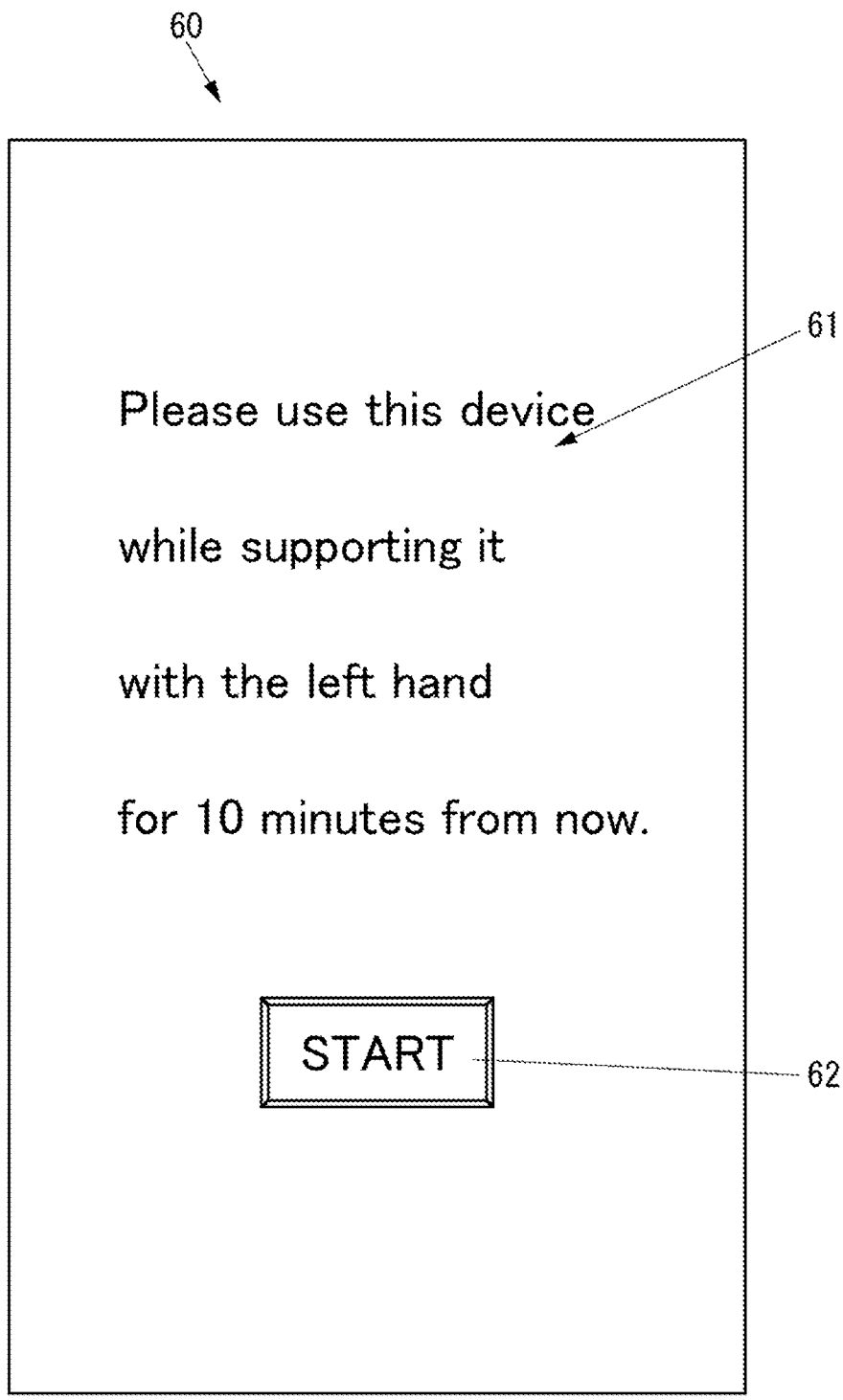
FIG. 20 is a view illustrating an example of a left hand support instruction screen displayed in the operation illustrated in FIG. 18.

FIG. 20 is a view illustrating an example of the left hand support instruction screen 60.

The left hand support instruction screen 60 illustrated in FIG. 20 includes a message 61 "Please use this device while supporting it with the left hand for 10 minutes from now" and a start button 62 for the user to start supporting the smartphone 10 in accordance with the content illustrated in the message 61. Note that the period indicated in the message 61, that is, "10 minutes" can be changed in advance by the user.

As illustrated in FIGS. 12, 18, and 19, after the processing in S261, the support status determination unit 20a determines whether or not the start button 62 has been pressed until it is determined that the start button 62 has been pressed (S262).

In a case where it is determined in S262 that the start button 62 has been pressed, the support status determination unit 20a determines whether or not the period indicated by the message 61 has elapsed (S263).

In a case where it is determined in S263 that the period indicated by the message 61 has not elapsed, the support status determination unit 20a determines whether or not the support history information 19e has been updated (S264).

In a case where it is determined in S264 that the support history information 19e has not been updated, the support status determination unit 20a executes the processing in S263.

In a case where it is determined in S264 that the support history information 19e has been updated, the support status determination unit 20a determines whether or not the latest device support status indicated in the support history information 19e is a status in which the smartphone 10 is supported by the left hand of the user (S265).

In a case where it is determined in S265 that the latest device support status indicated in the support history information 19e is a status in which the smartphone 10 is supported by the left hand of the user, the support status determination unit 20a adds "correct" to the result history information 19f as a result of the current support status confirmation (S266).

In a case where it is determined in S265 that the latest device support status indicated in the support history information 19e is not a status in which the smartphone 10 is supported by the left hand of the user, the support status determination unit 20a adds "incorrect" to the result history information 19f as a result of the current support status confirmation (S267).

The support status determination unit 20a executes the processing in S263 after the processing in S266 or S267.

In a case where it is determined in S263 that the period indicated by the message 61 has elapsed, the support status determination unit 20a calculates the position of the smartphone 10, the inclination of the smartphone 10, the movement of the smartphone 10, the contact portion with the housing of the smartphone 10, and the change in the contact state with the display unit 12 of the smartphone 10 during a period from when it is determined in S262 that the start button 62 has been pressed until when the period indicated by the message 61 has elapsed, on the basis of the acquisition history information 19c and the reference information 19d (S268).

After the processing in S268, the support status determination unit 20a generates learning data by assigning, as a correct answer label, that the smartphone 10 is supported by the left hand of the user to the information calculated in S268 (S269).

After the processing in S269, the support status determination unit 20a displays, on the display unit 12, a right hand support instruction screen for instructing the user to use the smartphone 10 while supporting the smartphone 10 with the right hand (S270). The right hand support instruction screen is similar to the left hand support instruction screen 60 (see FIG. 20) except that the message "Please use this device while supporting it with the right hand for 10 minutes from now" is included instead of the message 61 (see FIG. 20).

After the processing in S270, the support status determination unit 20a determines whether or not the start button on the right hand support instruction screen has been pressed until it is determined that the start button on the right hand support instruction screen has been pressed (S271).

In a case where it is determined in S271 that the start button on the light hand support instruction screen has been pressed, the support status determination unit 20a determines whether or not the period indicated by the message on the right hand support instruction screen has elapsed (S272).

In a case where it is determined in S272 that the period indicated by the message on the right hand support instruction screen has not elapsed, the support status determination unit 20a determines whether or not the support history information 19e has been updated (S273).

In a case where it is determined in S273 that the support history information 19e has not been updated, the support status determination unit 20a executes the processing in S272.

In a case where it is determined in S273 that the support history information 19e has been updated, the support status determination unit 20a determines whether or not the latest device support status indicated in the support history information 19e is a status in which the smartphone 10 is supported by the right hand of the user (S274).

In a case where it is determined in S274 that the latest device support status indicated in the support history information 19e is a status in which the smartphone 10 is supported by the right hand of the user, the support status determination unit 20a adds "correct" to the result history information 19f as a result of the current support status confirmation (S275).

In a case where it is determined in S274 that the latest device support status indicated in the support history information 19e is not a status in which the smartphone 10 is supported by the right hand of the user, the support status determination unit 20a adds "incorrect" to the result history information 19f as a result of the current support status confirmation (S276).

The support status determination unit 20a executes the processing in S272 after the processing in S275 or S276.

In a case where it is determined in S272 that the period indicated by the message on the right hand support instruction screen has elapsed, the support status determination unit 20a calculates the position of the smartphone 10, the inclination of the smartphone 10, the movement of the smartphone 10, the contact portion with the housing of the smartphone 10, and the change in the contact state with the display unit 12 of the smartphone 10 during a period from when it is determined in S271 that the start button on the right hand support instruction screen has been pressed until when the period indicated by the message on the right hand support instruction screen has elapsed, on the basis of the acquisition history information 19c and the reference information 19d (S277).

After the processing in S277, the support status determination unit 20a generates learning data by assigning, as a correct answer label, that the smartphone 10 is supported by the right hand of the user to the information calculated in S277 (S278).

After the processing in S278, the support status determination unit 20a causes the support status determination model 19b to additionally learn the learning data generated in S269 and S278 (S279). After the processing in S279, the support status determination unit 20a executes the processing in S182.

As described above, the support status determination unit 20a updates the support status determination model 19b after the user logs into the smartphone 10 (see FIGS. 12, 13, 18, and 19). However, the support status determination unit 20a does not have to update the support status determination model 19b after the user logs into the smartphone 10. The support status determination unit 20a may be able to set whether or not to update the support status determination model 19b after the user logs into the smartphone 10 in accordance with an instruction from the user.

As described above, the information notification unit 20b makes notifications of the left hand use period, the right hand use period, the left hand use ratio, and the right hand use ratio as the information based on the result of the support status determination (S243). However, the information notification unit 20b may make notifications of information other than the left hand use period, the right hand use period, the left hand use ratio, and the right hand use ratio as the information based on the result of the support status determination. For example, the information notification unit 20b may make a notification of a current device support status as information based on the result of the support status determination.

Figure 21:
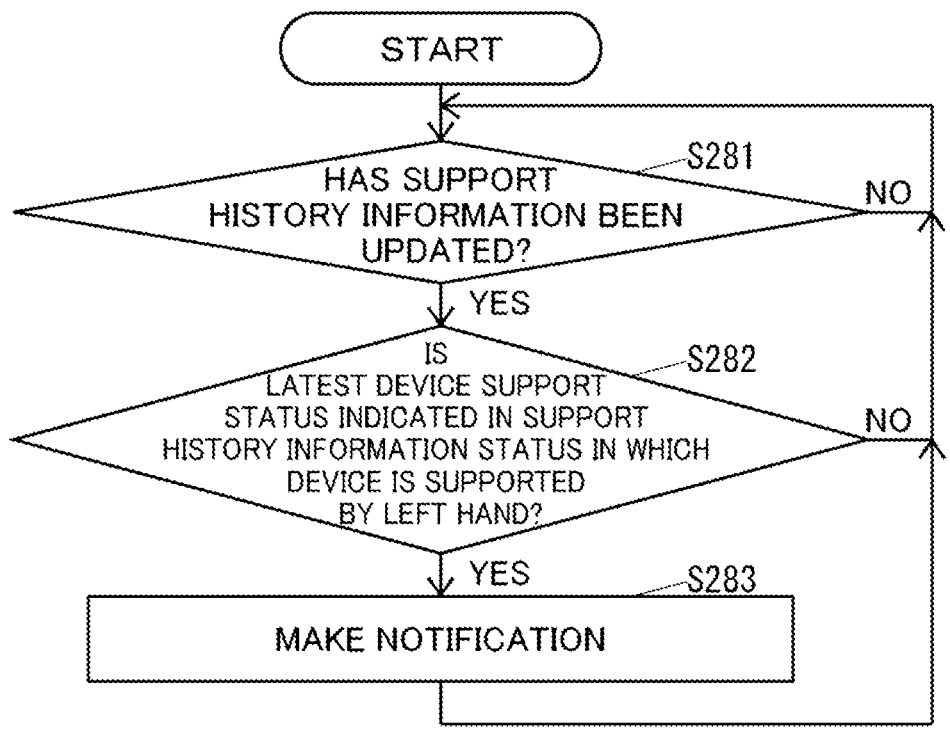
FIG. 21 is a flowchart of an example of operation of the smartphone illustrated in FIG. 1 in a case where a notification of a current device support status is made.

FIG. 21 is a flowchart of an example of the operation of the smartphone 10 in a case where a notification of the current device support status is made.

For example, in a case where the user of the smartphone 10 determines that fatigue and stiffness occur on the left side of the neck, the left shoulder, or the left arm of the user, the user can instruct the smartphone 10 to execute the operation illustrated in FIG. 21 via, for example, the position input device 11c. When the information notification unit 20b is instructed to execute the operation illustrated in FIG. 21, the information notification unit 20b executes the operation illustrated in FIG. 21.

As illustrated in FIG. 21, the information notification unit 20b determines whether or not the support history information 19e has been updated until it is determined that the support history information 19e has been updated (S281).

In a case where it is determined in S281 that the support history information 19e has been updated, the information notification unit 20b determines whether or not the latest device support status indicated in the support history information 19e is a status in which the smartphone 10 is supported by the left hand of the user (S282).

In a case where it is determined in S282 that the latest device support status indicated in the support history information 19e is a status in which the smartphone 10 is supported by the left hand of the user, the information notification unit 20b makes a notification that the smartphone 10 is supported by the left hand of the user by at least one of display by the display unit 12, output of sound by the speaker 13, and vibration by the vibration motor 16 (S283). This enables the user who has confirmed the notification in S283 to reduce fatigue and stiffness occurring on the left side of the neck, the left shoulder, or the left arm of the user by, for example, supporting the smartphone 10 with the right hand.

In a case where it is determined in S282 that the latest device support status indicated in the support history information 19*e* is not a status in which the smartphone 10 is supported by the left hand of the user or in a case where the processing in S283 ends, the information notification unit 20*b* executes the processing in S281.

As described above, the smartphone 10 executes the support status determination on the basis of the information acquired by the operation unit 11, the in-camera 15*b*, and the sensor unit 17 (S163) and notifies the user of the information based on the result of the executed support status determination (S243 and S283), so that the user can recognize the device support status.

The smartphone 10 updates the method for support status determination on the basis of the device support status of which the user is instructed in S141, S145, S149, S153, S261, and S270 and the result of the support status determination corresponding to the device support status of which the user is instructed in S141, S145, S149, S153, S261, and S270 (S157 and S279), so that accuracy of the support status determination can be improved.

The smartphone 10 instructs the user of the device support status at a frequency in accordance with an accuracy rate of the support status determination based on the device support status of which the user is instructed and the result of the support status determination corresponding to the device support status of which the user is instructed (S181 to S187, S261, and S270), so that it is possible to prevent the user from being instructed of the device support status at an unnecessarily high frequency.

The smartphone 10 updates the method for support status determination on the basis of the actual device support status input from the user in S192 and the result of the support status determination corresponding to the actual device support status input from the user in S192 (S205), so that accuracy of the support status determination can be improved.

The smartphone 10 instructs the user to input the actual device support status at a frequency in accordance with the accuracy rate of the support status determination based on the actual device support status input from the user and the result of the support status determination corresponding to the actual device support status input from the user (S181 to S187 and S191), so that it is possible to prevent the user from being instructed to input the actual device support status at an unnecessarily high frequency.

The smartphone 10 updates the method for support status determination on the basis of the plan of the device support status input from the user in S222 and the result of the support status determination corresponding to the plan of the device support status input from the user in S222 (S225), so that the accuracy of the support status determination can be improved.

Note that a case has not been described above where the smartphone 10 instructs the user to input the plan of the device support status at a frequency in accordance with the accuracy rate of the support status determination based on the plan of the device support status input from the user and the result of the support status determination corresponding to the plan of the device support status input from the user. However, the smartphone 10 may instruct the user to input the plan of the device support status at a frequency in accordance with the accuracy rate of the support status determination based on the plan of the device support status input from the user and the result of the support status determination corresponding to the plan of the device support status input from the user, in a similar manner to the case (S181 to S187, S261, and S270) where the user is instructed of the device support status at a frequency in accordance with the accuracy rate of the support status determination based on the device support status of which the user is instructed and the result of the support status determination corresponding to the device support status of which the user is instructed, or the case (S181 to S187 and S191) where the user is instructed to input the actual device support status at a frequency in accordance with the accuracy rate of the support status determination based on the actual device support status input from the user and the result of the support status determination corresponding to the actual device support status input from the user. In a case where the smartphone 10 instructs the user to input the plan of the device support status at a frequency in accordance with the accuracy rate of the support status determination based on the plan of the device support status input from the user and the result of the support status determination corresponding to the plan of the device support status input from the user, it is possible to prevent the user from being instructed to input the plan of the device support status at an unnecessarily high frequency.

The smartphone 10 can make a notification of the left hand use period that is a period during which the smartphone 10 is used while being supported by the left hand of the user, that is, a period during a specific type of the device support status (S243), so that the user can recognize the period during which the smartphone 10 is used while being supported by the left hand of the user. Similarly, the smartphone 10 can make a notification of the right hand use period that is a period during which the smartphone 10 is used while being supported by the right hand of the user, that is, a period during a specific type of the device support status (S243), so that the user can recognize the period during which the smartphone 10 is used while being supported by the right hand of the user.

The smartphone 10 makes a notification of a period during which the device support status is each of a plurality of types of the device support status, that is, the left hand use period that is a period during which the device support status is a status in which the smartphone 10 is used while being supported by the left hand of the user and the right hand use period that is a period during which the device support status is a status in which the smartphone 10 is used while being supported by the right hand of the user (S243), so that in a case where the device support status is biased to either the status in which the smartphone 10 is used while being supported by the left hand of the user or the status in which the smartphone 10 is used while being supported by the right hand of the user, the smartphone 10 can cause the user to recognize to which one of the status in which the smartphone 10 is used while being supported by the left hand of the user and the status in which the smartphone 10 is used while being supported by the right hand of the user, the device support status is biased and to what extent the device support status is biased. Similarly, the smartphone 10 makes a notification of a ratio of the period during which the device support status is each of the plurality of types of the device support status, that is, a ratio between the left hand use period that is a period during which the smartphone 10 is used while being supported by the left hand of the user, and the right hand use period that is a period during which the smartphone 10 is used while being supported by the right hand of the user (S243), so that in a case where the device support status is biased to either the status in which the smartphone 10 is used while being supported by the left hand of the user or the status in which the smartphone 10 is used while being supported by the right hand of the user, the smartphone 10 can cause the user to recognize to which one of the status in which the smartphone 10 is used while being supported by the left hand of the user and the status in which the smartphone 10 is used while being supported by the right hand of the user, the device support status is biased and to what extent the device support status is biased.

The smartphone 10 can cause the user to recognize to which one of the status in which the smartphone 10 is used while being supported by the left hand of the user and the status in which the smartphone 10 is used while being supported by the right hand of the user, the device support status is biased and to what extent the device support status is biased, so that the smartphone 10 can cause the user to adjust balance between the status in which the smartphone 10 is used while being supported by the left hand of the user and the status in which the smartphone 10 is used while being supported by the right hand of the user. Thus, in a case where fatigue and stiffness occur in at least one of the left side of the neck, the left shoulder, and the left arm of the user or at least one of the right side of the neck, the right shoulder, and the right arm of the user due to bias between the status in which the smartphone 10 is used while being supported by the left hand of the user and the status in which the smartphone 10 is used while being supported by the right hand of the user, these fatigue and stiffness can be reduced. In addition, in a case where balance of the left and right muscle strength of the user is lost due to bias between the status in which the smartphone 10 is used while being supported by the left hand of the user and the status in which the smartphone 10 is used while being supported by the right hand of the user, this loss can be reduced. In addition, in a case where balance between use of the left brain and use of the right brain of the user is lost due to bias between the status in which the smartphone 10 is used while being supported by the left hand of the user and the status in which the smartphone 10 is used while being supported by the right hand of the user, this loss can be reduced.

The smartphone 10 can make a notification of the current device support status (S283), so that the user can recognize the current device support status.

The smartphone 10 acquires the position of the smartphone 10, the inclination of the smartphone 10, the movement of the smartphone 10, the portion where the user contacts the housing of the smartphone 10, the change in the state where the user contacts the touch panel of the smartphone 10, the fingerprint of the user acquired by the smartphone 10, the face image of the user supporting the smartphone 10, which is captured by the smartphone 10, and the irregularities of the face of the user supporting the smartphone 10, which is detected by the smartphone 10, as the information to be used for the support status determination, so that accuracy of the support status determination can be improved.

In the above description, the smartphone 10 makes a notification of a status as to which of the left hand and the right hand of the user is used to support the smartphone 10. However, the smartphone 10 can also make a notification of a status as to which of the left arm and the right arm of the user is used to support the smartphone 10 using a similar mechanism. Note that in the present invention, the arm means a portion from the shoulder to a tip of the hand of a person and includes the hand. For example, the smartphone 10 may be worn on the user's arm by a band.

In the above description, the smartphone 10 makes a notification of a status as to which of the left arm and the right arm of the user is used to support the smartphone 10. However, the smartphone 10 can also make a notification of, using a similar mechanism, a status as to on which one of the upper side and the lower side of a specific position in a vertical direction, the smartphone 10 is supported. The smartphone 10 can also make a notification of, using a similar mechanism, a status as to on which one of a front side and a rear side of a specific position in a front-back direction for the user, the smartphone 10 is supported. Here, the specific position in the vertical direction and the specific position in the front-back direction for the user are, for example, a position of the smartphone 10 at an arbitrary timing such as when the user logs into the smartphone 10. In a case where the smartphone 10 makes a notification of a status as to on which one of the upper side and the lower side of the specific position in the vertical direction, the smartphone 10 is supported, for example, when the device support status is biased to either a status in which the smartphone 10 is supported by the user on the upper side of the specific position in the vertical direction or a status in which the smartphone 10 is supported by the user on the lower side of the specific position in the vertical direction, the smartphone 10 can cause the user to recognize to which one of the status in which the smartphone 10 is supported by the user on the upper side of the specific position in the vertical direction and the status in which the smartphone 10 is supported by the user on the lower side of the specific position in the vertical direction, the device support status is biased and to what extent the device support status is biased. Furthermore, in a case where the smartphone 10 makes a notification of a status as to on which one of the front side and the back side of the specific position in the front-back direction for the user, the smartphone 10 is supported, for example, when the device support status is biased to either a status in which the smartphone 10 is supported by the user on the front side of the specific position in the front-back direction for the user or a status in which the smartphone 10 is supported by the user on the back side of the specific position in the front-back direction for the user, the smartphone 10 can cause the user to recognize to which one of the status in which the smartphone 10 is supported by the user on the front side of the specific position in the front-back direction for the user and the status in which the smartphone 10 is supported by the user on the back side of the specific position in the front-back direction for the user, the device support status is biased and to what extent the device support status is biased.

Figure 22:
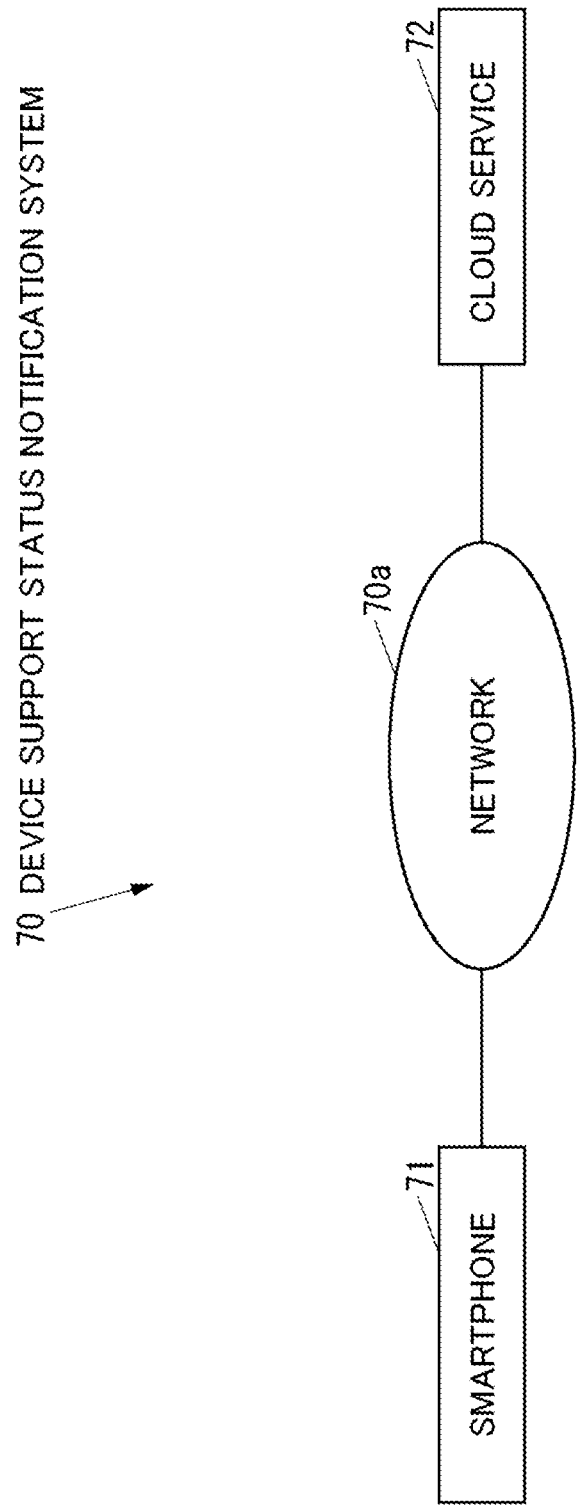
FIG. 22 is a block diagram illustrating an example different from the example illustrated in FIG. 2 of a device support status notification system according to an embodiment of the present invention.

FIG. 22 is a block diagram illustrating an example different from the example illustrated in FIG. 2 of the device support status notification system according to the present embodiment.

An example has been described above where the device support status notification system of the present invention is constituted with only the electronic device of the present invention. However, the device support status notification system of the present invention may be constituted with the electronic device of the present invention and at least one electronic device outside the electronic device of the present invention. For example, a device support status notification system 70 illustrated in FIG. 22 is constituted with a smartphone 71 as the electronic device of the present invention and a cloud service 72 with which the smartphone 71 can communicate via a network 70a. The cloud service 72 implements some of the functions implemented by the smartphone 10 (see FIG. 2) instead of the smartphone 71.

An example has been described above where the electronic device of the present invention is a smartphone. However, the electronic device of the present invention may be a device other than a smartphone as long as at least part of the electronic device is carried by the user and used by the user. For example, the electronic device of the present invention may be a mobile phone other than a smartphone, a fixed phone, a tablet, a wearable terminal, a digital camera, or a laser pointer. Here, examples of the wearable terminal can include a smart watch, a ring-type activity meter, and the like. The electronic device of the present invention preferably includes a display unit.

As described above, the device support status notification system of the present invention makes notifications of the left hand use period, the right hand use period, the left hand use ratio, and the right hand use ratio (S243). However, the device support status notification system of the present invention may calculate a total period (hereinafter, referred to as a "left hand support period") during which the electronic device is supported by the left hand of the user in a specific period, a total period (hereinafter, referred to as a "right hand support period") during which the electronic device is supported by the right hand of the user in the specific period, a ratio of the left hand support period (hereinafter, referred to as a "left hand support ratio") with respect to the total of the left hand support period and the right hand support period, and a ratio of the right hand support period (hereinafter, referred to as a "right hand support ratio") with respect to the total of the left hand support period and the right hand support period and may make notifications of the calculated left hand support period, right hand support period, left hand support ratio, and right hand support ratio instead of or in addition to the left hand use period, the fight hand use period, the left hand use ratio, and the right hand use ratio. In particular, in a case where the electronic device of the present invention is a wearable terminal, it is extremely effective for the device support status notification system of the present invention to make notifications of the left hand support period, the right hand support period, the left hand support ratio, and the right hand support ratio.

What is claimed is:

1. A device support status notification system comprising:
   an information acquisition unit configured to acquire information for determination that is information to be used for support status determination that is determination of a device support status that is a status of support by a user, of an electronic device to be carried by the user and used by the user;
   a support status determination unit configured to execute the support status determination on a basis of the information for determination acquired by the information acquisition unit; and
   an information notification unit configured to make a notification of information for notification that is information based on a result of the support status determination executed by the support status determination unit,
   wherein the information notification unit makes a notification of at least one of a period during which the device support status is each of a plurality of types of the device support status or a ratio of the period during which the device support status is each of the plurality of types of the device support status as the information for notification.

2. The device support status notification system according to claim 1,
   wherein the plurality of types of the device support status comprises:
   the device support status in which the electronic device is supported by a left arm of the user; and
   the device support status in which the electronic device is supported by a right arm of the user.

3. The device support status notification system according to claim 2,
   wherein the support status determination unit instructs the user of the device support status, and
   the support status determination unit updates a method for the support status determination on a basis of the device support status of which the user is instructed and a result of the support status determination corresponding to the device support status of which the user is instructed.

4. The device support status notification system according to claim 3,
   wherein the support status determination unit instructs the user of the device support status at a frequency in accordance with an accuracy rate of the support status determination based on the device support status of which the user is instructed and a result of the support status determination corresponding to the device support status of which the user is instructed.

5. The device support status notification system according to claim 2,
   wherein the support status determination unit receives an input of an actual device support status from the user, and
   the support status determination unit updates a method for the support status determination on a basis of the actual device support status input from the user and a result of the support status determination corresponding to the actual device support status input from the user.

6. The device support status notification system according to claim 5,
   wherein the support status determination unit instructs the user to input the actual device support status at a frequency in accordance with an accuracy rate of the support status determination based on the actual device support status input from the user and a result of the support status determination corresponding to the actual device support status input from the user.

7. The device support status notification system according to claim 2,
   wherein the support status determination unit receives an input of a plan of the device support status from the user, and
   the support status determination unit updates a method for the support status determination on a basis of the plan of the device support status input from the user and a result of the support status determination corresponding to the plan of the device support status input from the user.

8. The device support status notification system according to claim 7,
   wherein the support status determination unit instructs the user to input the plan of the device support status at a frequency in accordance with an accuracy rate of the support status determination based on the plan of the device support status input from the user and a result of the support status determination corresponding to the plan of the device support status input from the user.

9. The device support status notification system according to claim 1,
wherein the plurality of types of the device support status comprises:
the device support status in which the electronic device is supported by the user on an upper side of a specific position in a vertical direction; and
the device support status in which the electronic device is supported by the user on a lower side of the specific position.

10. The device support status notification system according to claim 1,
wherein the plurality of types of the device support status comprises:
the device support status in which the electronic device is supported by the user on a front side of a specific position in a front-back direction for the user; and
the device support status in which the electronic device is supported by the user on a back side of the specific position.

11. The device support status notification system according to claim 1,
wherein the support status determination unit instructs the user of the device support status, and
the support status determination unit updates a method for the support status determination on a basis of the device support status of which the user is instructed and a result of the support status determination corresponding to the device support status of which the user is instructed.

12. The device support status notification system according to claim 11,
wherein the support status determination unit instructs the user of the device support status at a frequency in accordance with an accuracy rate of the support status determination based on the device support status of which the user is instructed and a result of the support status determination corresponding to the device support status of which the user is instructed.

13. The device support status notification system according to claim 1,
wherein the support status determination unit receives an input of an actual device support status from the user, and
the support status determination unit updates a method for the support status determination on a basis of the actual device support status input from the user and a result of the support status determination corresponding to the actual device support status input from the user.

14. The device support status notification system according to claim 13,
wherein the support status determination unit instructs the user to input the actual device support status at a frequency in accordance with an accuracy rate of the support status determination based on the actual device support status input from the user and a result of the support status determination corresponding to the actual device support status input from the user.

15. The device support status notification system according to claim 1,
wherein the support status determination unit receives an input of a plan of the device support status from the user, and
the support status determination unit updates a method for the support status determination on a basis of the plan of the device support status input from the user and a result of the support status determination corresponding to the plan of the device support status input from the user.

16. The device support status notification system according to claim 15,
wherein the support status determination unit instructs the user to input the plan of the device support status at a frequency in accordance with an accuracy rate of the support status determination based on the plan of the device support status input from the user and a result of the support status determination corresponding to the plan of the device support status input from the user.

17. A computer-readable non-transitory storage medium storing a device support status notification program for causing an electronic device to implement:
a support status determination unit configured to execute support status determination on a basis of information for determination acquired by an information acquisition unit configured to acquire the information for determination that is information to be used for the support status determination that is determination of a device support status that is a status of support by a user, of the electronic device to be carried by the user and used by the user; and
an information notification unit configured to make a notification of information for notification that is information based on a result of the support status determination executed by the support status determination unit,
wherein the information notification unit makes a notification of at least one of a period during which the device support status is each of a plurality of types of the device support status or a ratio of the period during which the device support status is each of the plurality of types of the device support status as the information for notification.

18. The computer-readable non-transitory storage medium storing a device support status notification program according to claim 17 for causing the electronic device to further implement:
wherein the plurality of types of the device support status comprises:
the device support status in which the electronic device is supported by a left arm of the user;
the device support status in which the electronic device is supported by a right arm of the user;
wherein the support status determination unit instructs the user of the device support status,
the support status determination unit updates a method for the support status determination on a basis of the device support status of which the user is instructed and a result of the support status determination corresponding to the device support status of which the user is instructed; and
wherein the support status determination unit instructs the user of the device support status at a frequency in accordance with an accuracy rate of the support status determination based on the device support status of which the user is instructed and a result of the support status determination corresponding to the device support status of which the user is instructed.

19. The computer-readable non-transitory storage medium storing a device support status notification program according to claim 17 for causing the electronic device to further implement:
   wherein the plurality of types of the device support status comprises:
   the device support status in which the electronic device is supported by a left arm of the user;
   the device support status in which the electronic device is supported by a right arm of the user;
   wherein the support status determination unit receives an input of an actual device support status from the user,
   the support status determination unit updates a method for the support status determination on a basis of the actual device support status input from the user and a result of the support status determination corresponding to the actual device support status input from the user; and
   wherein the support status determination unit instructs the user to input the actual device support status at a frequency in accordance with an accuracy rate of the support status determination based on the actual device support status input from the user and a result of the support status determination corresponding to the actual device support status input from the user.

20. The computer-readable non-transitory storage medium storing a device support status notification program according to claim 17 for causing the electronic device to further implement:
   wherein the plurality of types of the device support status comprises:
   the device support status in which the electronic device is supported by a left arm of the user; and
   the device support status in which the electronic device is supported by a right arm of the user;
   wherein the support status determination unit receives an input of a plan of the device support status from the user,
   the support status determination unit updates a method for the support status determination on a basis of the plan of the device support status input from the user and a result of the support status determination corresponding to the plan of the device support status input from the user; and
   wherein the support status determination unit instructs the user to input the plan of the device support status at a frequency in accordance with an accuracy rate of the support status determination based on the plan of the device support status input from the user and a result of the support status determination corresponding to the plan of the device support status input from the user.

21. The computer-readable non-transitory storage medium storing a device support status notification program according to claim 17 for causing the electronic device to further implement:
   wherein the support status determination unit instructs the user of the device support status,
   the support status determination unit updates a method for the support status determination on a basis of the device support status of which the user is instructed and a result of the support status determination corresponding to the device support status of which the user is instructed; and
   wherein the support status determination unit instructs the user of the device support status at a frequency in accordance with an accuracy rate of the support status determination based on the device support status of which the user is instructed and a result of the support status determination corresponding to the device support status of which the user is instructed.

22. The computer-readable non-transitory storage medium storing a device support status notification program according to claim 17 for causing the electronic device to further implement:
   wherein the support status determination unit receives an input of an actual device support status from the user,
   the support status determination unit updates a method for the support status determination on a basis of the actual device support status input from the user and a result of the support status determination corresponding to the actual device support status input from the user; and
   wherein the support status determination unit instructs the user to input the actual device support status at a frequency in accordance with an accuracy rate of the support status determination based on the actual device support status input from the user and a result of the support status determination corresponding to the actual device support status input from the user.

23. The computer-readable non-transitory storage medium storing a device support status notification program according to claim 17 for causing the electronic device to further implement:
   wherein the support status determination unit receives an input of a plan of the device support status from the user,
   the support status determination unit updates a method for the support status determination on a basis of the plan of the device support status input from the user and a result of the support status determination corresponding to the plan of the device support status input from the user; and
   wherein the support status determination unit instructs the user to input the plan of the device support status at a frequency in accordance with an accuracy rate of the support status determination based on the plan of the device support status input from the user and a result of the support status determination corresponding to the plan of the device support status input from the user.

* * * * *